United States Patent
Jung

(10) Patent No.: US 9,164,339 B2
(45) Date of Patent: Oct. 20, 2015

(54) DISPLAY APPARATUS

(71) Applicant: Samsung Display Co., Ltd., Yongin, Gyeonggi-Do (KR)

(72) Inventor: Hyunggi Jung, Cheonan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 6 days.

(21) Appl. No.: 14/283,584

(22) Filed: May 21, 2014

(65) Prior Publication Data

US 2015/0146123 A1 May 28, 2015

(30) Foreign Application Priority Data

Nov. 26, 2013 (KR) .......................... 10-2013-0144698

(51) Int. Cl.
*G02F 1/1333* (2006.01)
*G02F 1/1362* (2006.01)
*G02F 1/1345* (2006.01)

(52) U.S. Cl.
CPC ........ *G02F 1/136286* (2013.01); *G02F 1/1345* (2013.01); *G02F 1/13452* (2013.01); *G02F 2001/136218* (2013.01); *G02F 2001/136222* (2013.01)

(58) Field of Classification Search
CPC ........................... G02F 1/13452; G02F 1/1345
See application file for complete search history.

(56) References Cited

U.S. PATENT DOCUMENTS

| | | | |
|---|---|---|---|
| 8,338,078 B2 | 12/2012 | Hatakeyama et al. |
| 2009/0140438 A1 | 6/2009 | Yamazaki et al. |
| 2010/0104977 A1 | 4/2010 | Hatakeyama et al. |
| 2013/0033627 A1 | 2/2013 | Chen et al. |
| 2013/0038958 A1 | 2/2013 | Lin et al. |
| 2013/0128548 A1 | 5/2013 | Lin |
| 2013/0162549 A1 | 6/2013 | Kim et al. |

FOREIGN PATENT DOCUMENTS

| | | |
|---|---|---|
| KR | 100326430 B1 | 2/2002 |
| KR | 1020020024417 A | 3/2002 |
| KR | 1020060013063 A | 2/2006 |
| KR | 1020120124919 A | 11/2012 |

*Primary Examiner* — Phu Vu
(74) *Attorney, Agent, or Firm* — Innovation Counsel LLP

(57) ABSTRACT

A display apparatus includes a display panel including a display area in which a plurality of pixels is disposed and a non-display area adjacent to the display area. A plurality of dummy patterns extends in a first direction and is disposed in a predetermined area of the display area and a predetermined area of the non-display area at a boundary area between the display area and the non-display area. A plurality of color filters extends in a second direction perpendicular to the first direction in the display area to overlap with the pixels arranged in the second direction. A predetermined area of the color filters disposed adjacent to the non-display area in the second direction is partially overlapped with a corresponding dummy pattern.

20 Claims, 17 Drawing Sheets

DISPLAY APPARATUS

CROSS-REFERENCE TO RELATED APPLICATION

This U.S. non-provisional patent application claims priority under 35 U.S.C. §119 of Korean Patent Application No. 10-2013-0144698, filed on Nov. 26, 2013, the contents of which are hereby incorporated by reference.

BACKGROUND

1. Field of Disclosure

The present disclosure relates to a display apparatus. More particularly, the present disclosure relates to a display apparatus capable of preventing peeling of a color filter.

2. Description of the Related Art

In general, a display apparatus includes gate lines receiving gate signals, data lines receiving data voltages, pixels connected to the gate lines and the data lines, and color filters providing colors to the pixels.

Each of the pixels receives the data voltage through a corresponding data line of the data lines in response to the gate signal provided through a corresponding gate line of the gate lines. The pixels display gray scales corresponding to the data voltages. The color filters provide colors to light transmitting through the pixels. Thus, desired images are displayed by the pixels.

SUMMARY

The present disclosure provides a display apparatus capable of preventing peeling of a color filter.

Embodiments of the inventive concept provide a display apparatus including a display panel. The display panel includes a display area in which a plurality of pixels is disposed and a non-display area disposed adjacent to the display area. A plurality of dummy patterns extends in a first direction and is disposed in a predetermined area of the display area and a predetermined area of the non-display area at a boundary area between the display area and the non-display area. A plurality of color filters extends in a second direction substantially perpendicular to the first direction in the display area to overlap with the pixels arranged in the second direction. A predetermined area of the color filters adjacent to the non-display area in the second direction is partially overlapped with a corresponding dummy pattern of the dummy patterns.

The dummy patterns include a metal material that reflects a light.

The display area includes a pixel area corresponding to each pixel, a first non-pixel area disposed adjacent to the pixel area and extending in the first direction, and a second non-pixel area disposed adjacent to the pixel area and extending in the second direction. A predetermined area of the dummy patterns is disposed in a predetermined area of the first non-pixel area in an upper portion of the display area and in a predetermined area of the first non-pixel area in a lower portion of the display area.

The dummy patterns include a plurality of first dummy patterns and a plurality of second dummy patterns. The plurality of first dummy patterns is disposed in the predetermined area of the first non-pixel area adjacent to a first boundary area and is disposed in the predetermined area of the non-display area. The first boundary area corresponds to a boundary between the upper portion of the display area and the non-display area in the second direction. The plurality of second dummy patterns is disposed in the predetermined area of the first non-pixel area adjacent to a second boundary area and is disposed in the predetermined area of the non-display area. The second boundary area corresponds to a boundary between the lower portion of the display area and the non-display area.

A center portion of the first dummy patterns is overlapped with the first boundary area in the second direction, and a center portion of the second dummy patterns is overlapped with the second boundary area in the second direction.

A predetermined area in an upper portion of the color filters disposed adjacent to the first boundary area is overlapped with the first dummy patterns disposed in the predetermined area of the first non-pixel area adjacent to the first boundary area. A predetermined area in a lower portion of the color filters disposed adjacent to the second boundary area is overlapped with the second dummy patterns disposed in the predetermined area of the first non-pixel area adjacent to the second boundary area.

Each pixel includes a pixel electrode, a gate line, a data line, and a thin film transistor. The pixel electrode is disposed in the pixel area. The gate line is disposed in the first non-pixel area and extends in the first direction. The data line is disposed in the second non-pixel area and extends in the second direction, the data line being insulated from the gate line while crossing the gate line. The thin film transistor is connected to the pixel electrode, the gate line, and the data line.

The dummy patterns are disposed between the data lines.

The dummy patterns are branched from each of the data lines and extend in both directions respectively corresponding to the first direction and an opposite direction to the first direction.

The dummy patterns are branched from each of the data lines and extend in a right direction corresponding to the first direction.

The dummy patterns are branched from each of the data lines and extend in a left direction corresponding to the opposite direction to the first direction.

The dummy patterns include a same material as the data line and are disposed on a same layer as the data line.

The dummy patterns include a same material as the gate line and are disposed on a same layer as the gate line.

Each pixel further includes a storage line, first and second branch electrodes, a shielding electrode, and a black matrix. The storage line extends in the first direction and is disposed to face the gate line while the pixel area is interposed between the storage line and the gate line. The first and second branch electrodes branch from the storage line and extend in the second direction to be spaced apart from each other. The shielding electrode extends in the second direction and is disposed in the second non-pixel area, the shielding electrode having a width greater than a width of the data line in the first direction. The black matrix is disposed in the first non-pixel area. The storage line is disposed in the upper portion of the display area. The first and second branch electrodes and the storage line disposed between the first branch electrode and the second branch electrode are partially overlapped with the pixel electrode.

The dummy patterns include a plurality of first dummy patterns branched from a first storage line disposed in the upper portion of the display area in an upper direction opposite to the second direction and a plurality of second dummy patterns branched from a last gate line disposed in the lower portion of the display area in the second direction.

Embodiments of the inventive concept provide a display apparatus including a display panel. The display panel includes a display area in which a plurality of pixels is disposed and a non-display area disposed adjacent to the display area. A plurality of dummy patterns extends in a first direction and is disposed in the non-display area. A plurality of color filters extends in a second direction substantially perpendicular to the first direction in the display area to overlap with the pixels arranged in the second direction. A plurality of dummy color filters extends in the second direction from the color filters and is disposed in the non-display area. The dummy patterns are partially overlapped with corresponding dummy color filters in the second direction.

According to the above, the display apparatus may prevent the color filters from peeling.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
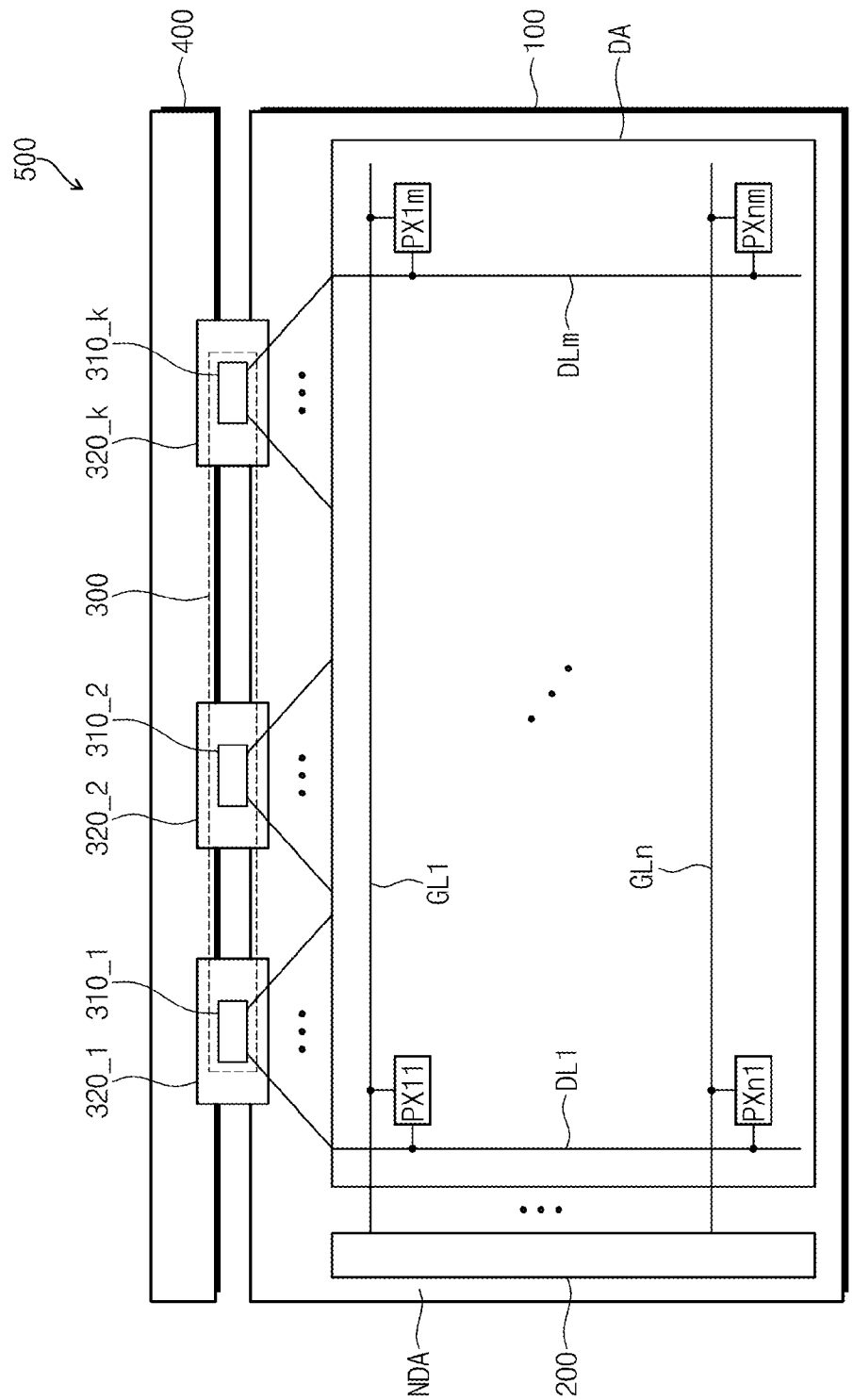
FIG. 1 is a plan view showing a display apparatus according to a first exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

FIG. 1 is a plan view showing a display apparatus according to a first exemplary embodiment of the present disclosure.

Referring to FIG. 1, a display apparatus 500 according to the present exemplary embodiment includes a display panel 100, a gate driver 200, a data driver 300, and a driving circuit board 400.

The display panel 100 includes a plurality of pixels PX11 to PXnm, a plurality of gate lines GL1 to GLn, and a plurality of data lines DL1 to DLm. The display panel 100 includes a display area DA and a non-display area NDA surrounding the display area DA when viewed in a plan view.

The pixels PX11 to PXnm are arranged in a matrix form and disposed in the display area DA. For instance, the pixels PX11 to PXnm are arranged in n rows by m columns crossing each other. Each of "n" and "m" is an integer number greater than zero (0).

The gate lines GL1 to GLn are insulated from the data lines DL1 to DLm while crossing the data lines DL1 to DLm. The gate lines GL1 to GLn are connected to the gate driver 200 to sequentially receive gate signals. The data lines DL1 to DLm are connected to the data driver 300 to receive data voltages in analog form.

Each of the pixels PX11 to PXnm is connected to a corresponding gate line of the gate lines GL1 to GLn and a corresponding data line of the data lines DL1 to DLm. Each of the pixels PX11 to PXnm receives the data voltage through the corresponding data line of the data lines DL1 to DLm in response to the gate signal applied through the corresponding gate line of the gate lines GL1 to GLn. The pixels PX11 to PXnm display gray scales corresponding to the data voltages.

The gate driver 200 generates the gate signals in response to a gate control signal applied from a timing controller (not shown) mounted on the driving circuit board 400. The gate signals are sequentially applied to the pixels PX11 to PXnm through the gate lines GL1 to GLn in the unit of row. Thus, the pixels PX11 to PXnm are driven in the unit of row.

The gate driver 200 is disposed in the non-display area NDA disposed adjacent to a left side of the display area DA. The gate driver 200 is mounted on the non-display area NDA disposed adjacent to the left side of the display area DA in an amorphous silicon TFT gate driver circuit (ASG).

However, it should not be limited thereto or thereby. That is, the gate driver 200 may include a plurality of gate driving chips. The gate driving chips may be mounted on the non-display area NDA disposed adjacent to the left side of the display area DA in a chip on glass (COG) manner or the gate driving chips may be connected to the non-display area NDA disposed adjacent to the left side of the display area DA in a tape carrier package (TCP) manner.

The data driver 300 receives image signals and a data control signal from the timing controller. The data driver 300 generates the data voltages in analog form, which correspond to the image signals, in response to the data control signal. The data driver 300 applies the data voltages to the pixels PX11 to PXnm through the data lines DL1 to DLm.

The data driver 300 includes a plurality of source driving chips 310_1 to 310_k. "k" is an integer number greater than zero (0) and smaller than "m". Each of the source driving chips 310_1 to 310_k is mounted on a corresponding flexible circuit board of flexible circuit boards 320_1 to 320_k and connected between the driving circuit board 400 and the non-display area NDA disposed adjacent to an upper portion of the display area DA. That is, the data driver 300 is connected to the display panel 100 in the tape carrier package (TCP) manner.

However, it should not be limited thereto or thereby. That is, the source driving chips 310_1 to 310_k may be mounted on the non-display area NDA disposed adjacent to the upper portion of the display area DA in the chip on glass (COG) manner.

Figure 2:
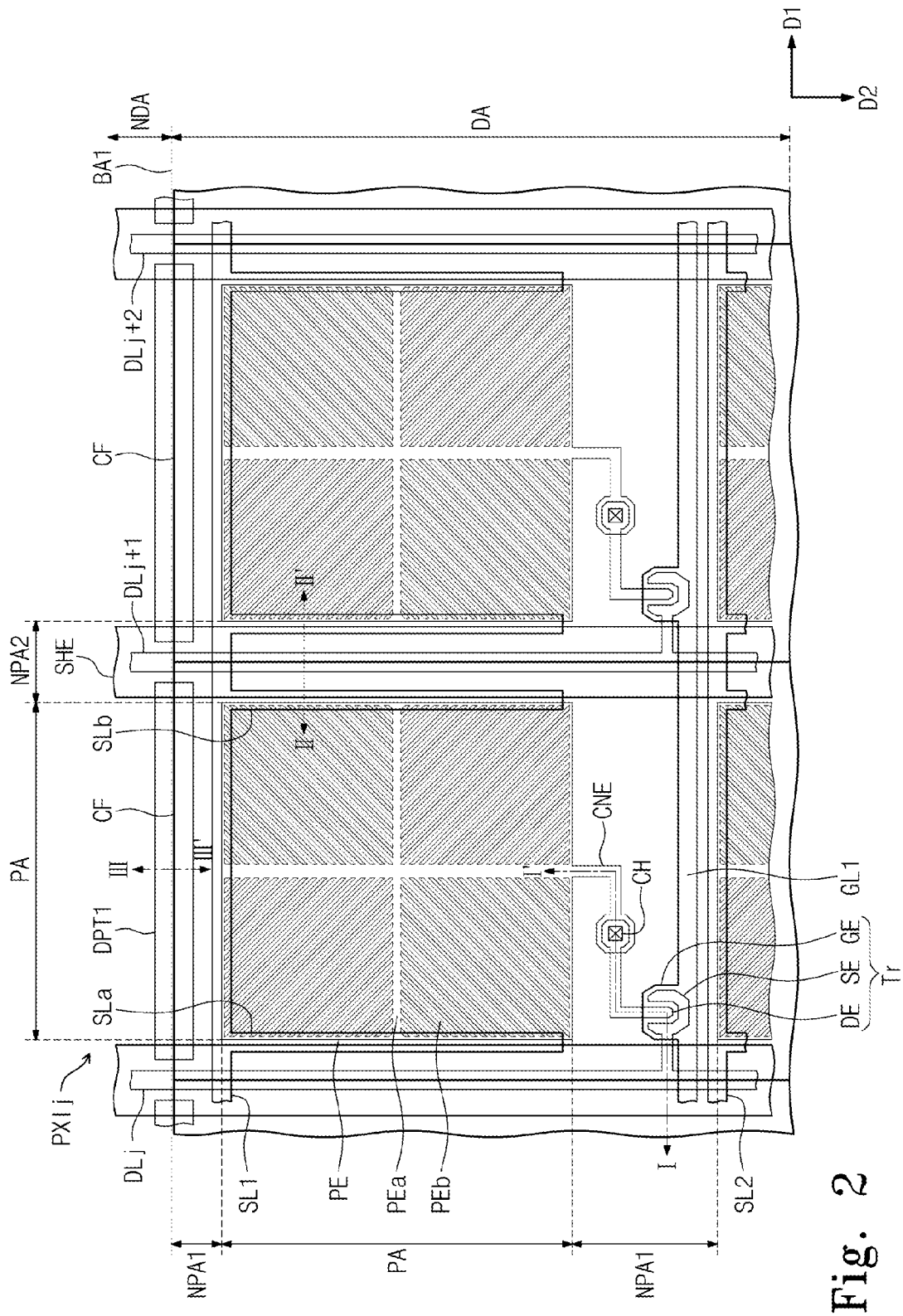
FIG. 2 is a plan view showing pixels disposed in an upper portion of a display area shown in FIG. 1.
Figure 3:
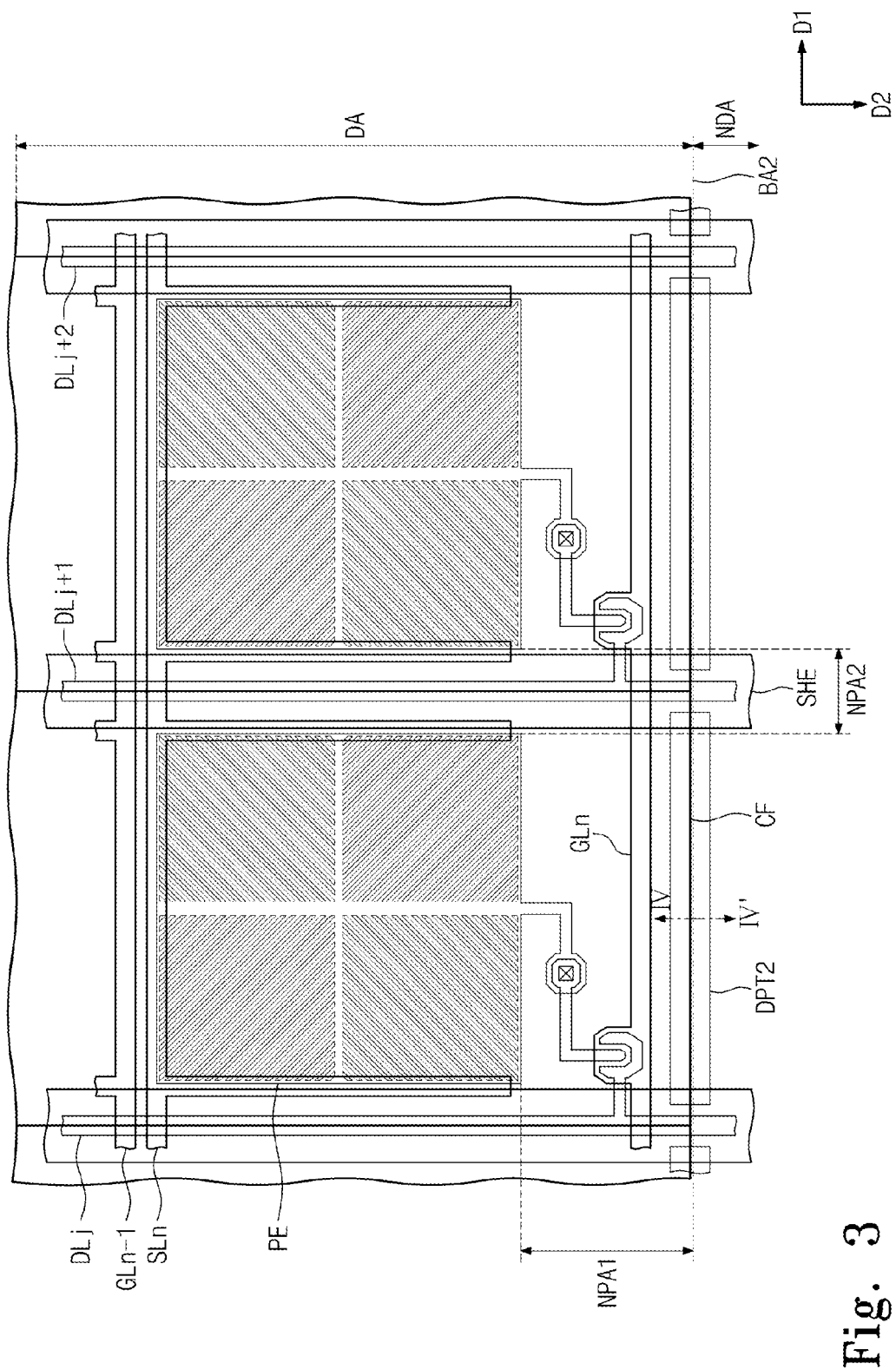
FIG. 3 is a plan view showing pixels disposed in a lower portion of the display area shown in FIG. 1.

FIG. 2 is a plan view showing the pixels disposed in the upper portion of the display area shown in FIG. 1, and FIG. 3 is a plan view showing the pixels disposed in the lower portion of the display area shown in FIG. 1.

For the convenience of explanation, FIGS. 2 and 3 show two pixels. However, the other pixels shown in FIG. 1 have the same circuit configuration as that of the two pixels. Thus, only one pixel PX1j shown in FIG. 2 will be described in detail.

Since the pixels shown in FIG. 2 are disposed in the upper portion of the display area DA, a first storage line SL1 and a first gate line GL1 are illustrated in FIG. 2. In addition, since the pixels shown in FIG. 3 are disposed in the lower portion of the display area DA, an n-th storage line SLn and an n-th gate line GLn are illustrated in FIG. 3.

Referring to FIGS. 2 and 3, the pixel PX1j includes a pixel area PA corresponding to the pixel PX1j and a non-pixel area NPA1 and NPA2 disposed adjacent to the pixel area PA in the display area DA. The pixel area PA is an area in which an image is displayed and the non-pixel area NPA1 and NPA2 is an area in which the image is not displayed.

The pixel PX1j is connected to a corresponding first gate line GL1 and a corresponding data line DLj. In detail, the pixel PX1j includes a transistor Tr connected to the corresponding first gate line GL1 and the corresponding data line DLj and a pixel electrode PE connected to the transistor Tr. The transistor Tr is disposed in the non-pixel area NPA1 and NPA2 and the pixel electrode PE is disposed in the pixel area PA.

The first gate line GL1 extends in a first direction D1 and is disposed in the non-pixel area NPA1 and NPA2. The data line DLj extends in a second direction D2 substantially perpendicular to the first direction D1 and is disposed in the non-pixel area NPA1 and NPA2. The data line DLj is insulated from the gate line GL1 while crossing the gate lines GL1. "j" is an integer number greater than zero (0) and smaller than or equal to "m".

The non-pixel area NPA1 and NPA2 includes a first non-pixel area NPA1 extending in the first direction D1 and a second non-pixel area NPA2 extending in the second direction D2. The first gate line GL1 is disposed in the first non-pixel area NPA1. The data line DLj is disposed in the second non-pixel area NPA2.

The transistor Tr includes a gate electrode GE connected to the first gate line GL1, a source electrode SE connected to the data line DLj, and a drain electrode DE connected to the pixel electrode PE.

The gate electrode GE of the transistor Tr is branched from the first gate line GL1. The source electrode SE is branched from the data line DLj. The drain electrode DE extends to be electrically connected to the pixel electrode PE through a contact hole CH.

The pixel electrode PE extends in the first non-pixel area NPA1 and is electrically connected to the drain electrode DE of the transistor Tr through the contact hole CH. In detail, a connection electrode CNE branched from the pixel electrode PE is connected to the drain electrode DE of the transistor Tr through the contact hole CH. The connection electrode CNE is disposed in the first non-pixel area NPA1.

The transistor Tr is turned on in response to the gate signal provided through the first gate line GL1. The turned-on transistor Tr receives the data voltage from the data line DLj and applies the data voltage to the pixel electrode PE.

The pixel PX1j further includes a storage electrode part. The storage electrode part is formed by a first storage line SL1, a first branch electrode SLa, and a second branch electrode SLb, which are partially overlapped with the pixel electrode PE.

Particularly, the first storage line SL1 extends in the first direction D1 and is disposed to face the corresponding first gate line GL1 while the pixel area PA is interposed between the first storage line SL1 and the first gate line GL1. For instance, the first storage line SL1 is disposed in an upper portion of the pixel area PA, and the first gate line GL1 is disposed in the first non-pixel area NPA1 disposed adjacent to a lower portion of the pixel area PA.

The first and second branch electrodes SLa and SLb are branched from the first storage line SL1 and extend in the second direction D2 to be spaced apart from each other. The first storage line SL1 is disposed between the first branch electrode SLa and the second branch electrode SLb. The first storage line SL1, the first branch electrode SLa, and the second branch electrode SLb are partially overlapped with the pixel electrode PE to form the storage electrode part.

An n-th gate line GLn and an n-th storage line SLn have the same structure and function as those of the first gate line GL1 and the first storage line SL1, respectively.

Although not shown in detail in figures, a plurality of storage lines SL1 to SLn corresponding to the gate lines GL1 to GLn is disposed in the display panel 100. The storage lines SL1 to SLn commonly receive a storage voltage or a common voltage. The storage lines SL1 to SLn are disposed on the same layer as the gate lines GL1 to GLn.

The pixel electrode PE includes a trunk portion PEa and a plurality of branch portions PEb protruded and radially extending from the trunk portion PEa. The trunk portion PEa may be provided in various shapes. As an exemplary embodiment, the trunk portion PEa may have a cross shape as shown in FIG. 2. In this case, the pixel PX1j is divided into four domains by the trunk portion PEa.

The branch portions PEb may extend in different directions in each domain. The branch portions PEb are arranged substantially in parallel to each other and spaced apart from each other in each domain, which is divided by the trunk portion PEa. The branch portions PEb adjacent to each other are spaced apart with a micrometer to form a plurality of fine slits.

The display panel 100 may include a liquid crystal layer interposed between two substrates facing each other. Liquid crystal molecules in the liquid crystal layer of the pixel PX1j are pre-tilted in different directions in each domain by the fine slits. Thus, four domains having different liquid crystal alignment directions are formed in the liquid crystal layer. A reference viewing angle of the display apparatus 100 including the liquid crystal layer may be widened due to the various directions in which the liquid crystal molecules are oriented.

The pixel electrode PE may include a transparent conductive material, such as indium tin oxide (ITO), indium zinc oxide (IZO), indium tin zinc oxide (ITZO), etc.

A shielding electrode SHE is disposed in the second non-pixel area NPA2. The shielding electrode SHE extends in the second direction D2. The shielding electrode SHE has a width greater than that of the data line DLj in the first direction D1. The shielding electrode SHE is disposed to overlap with the second non-pixel area NPA2. The shielding electrode SHE blocks a light in the second non-pixel area NPA2. Details on the structure of the shielding electrode SHE will be described in detail later.

The shielding electrode SHE includes the same material as that of the pixel electrode PE. That is, the shielding electrode SHE includes the transparent conductive material, such as indium tin oxide (ITO), indium zinc oxide (IZO), indium tin zinc oxide (ITZO), etc.

A plurality of color filters CF, which extends in the second direction D2, is disposed in the display area DA. The color filters CF are overlapped with the pixels arranged in the second direction D2. In detail, the color filters CF are disposed to respectively overlap with the pixel areas PA arranged in the second direction D2. The color filters CF are disposed to be adjacent to each other in the first direction D1.

A plurality of dummy patterns DPT1 and DPT2 is disposed in a predetermined area of the display area DA and a predetermined area of the non-display area NDA at a boundary area between the display area DA and the non-display area NDA. The dummy patterns DPT1 and DPT2 extend in the first direction D1 and are disposed between the data lines DLj, DLj+1, and DLj+2. The dummy patterns DPT1 and DPT2 may include a metal material to reflect the light.

A predetermined area of the color filters CF disposed adjacent to the non-display area NDA in the second direction D2 is partially overlapped with corresponding dummy patterns DPT1 and DPT2. For instance, the predetermined area of the color filters CF disposed adjacent to the non-display area NDA in the second direction D2 is overlapped with the dummy patterns DPT1 and DPT2 disposed in a predetermined area of the first non-pixel area NPA1 in the upper and lower portions of the display area DA.

Particularly, the dummy patterns DPT1 and DPT2 include a plurality of first dummy patterns DPT1 and a plurality of second dummy patterns DPT2. Hereinafter, the boundary area between the upper portion of the display area DA and the non-display area NDA in the second direction D2 is referred to as a first boundary area BA1. In addition, the boundary area between the lower portion of the display area DA and the non-display area NDA is referred to as a second boundary area BA2.

The first dummy patterns DPT1 are disposed in the predetermined area of the first non-pixel area NPA1 adjacent to the first boundary area BA1 and the predetermined area of the non-display area NDA adjacent to the first boundary area BA1.

A center portion of the first dummy patterns DPT1 in the second direction D2 is disposed to overlap with the first boundary area BA1, but it should not be limited thereto or thereby. That is, the center portion of the first dummy patterns DPT1 in the second direction D2 may be disposed at an upper portion of the first boundary area BA1 or a lower portion of the first boundary area BA1 when viewed in a plan view.

The predetermined area of the upper portion of the color filters CF is overlapped with the first dummy patterns DPT1 disposed in the predetermined area of the first non-pixel area NPA1 adjacent to the first boundary area BA1.

The second dummy patterns DPT2 are disposed in the predetermined area of the first non-pixel area NPA1 adjacent to the second boundary area BA2 and the predetermined area of the non-display area NDA adjacent to the second boundary area BA2.

A center portion of the second dummy patterns DPT2 in the second direction D2 is disposed to overlap with the second boundary area BA2, but it should not be limited thereto or thereby. That is, the center portion of the second dummy patterns DPT2 in the second direction D2 may be disposed at an upper portion of the second boundary area BA2 or a lower portion of the second boundary area BA2 when viewed in a plan view.

The predetermined area of the lower portion of the color filters CF is overlapped with the second dummy patterns DPT2 disposed in the predetermined area of the first non-pixel area NPA1 adjacent to the second boundary area BA2.

Figure 4:
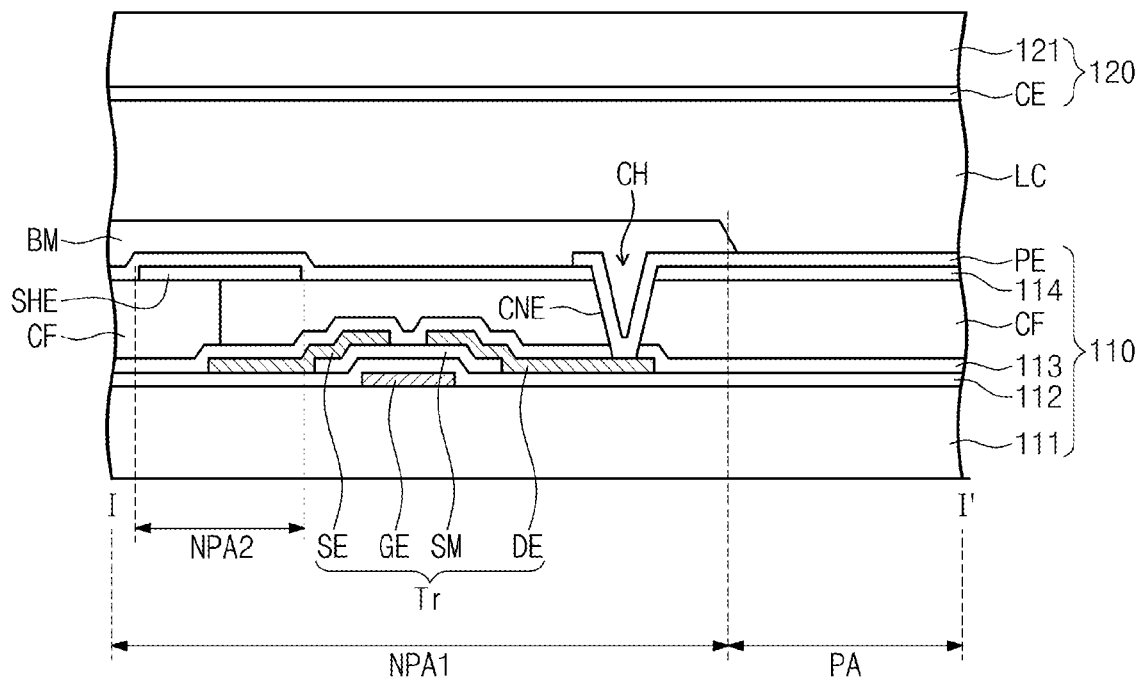
FIG. 4 is a cross-sectional view taken along a line I-I' of FIG. 2.
Figure 5:
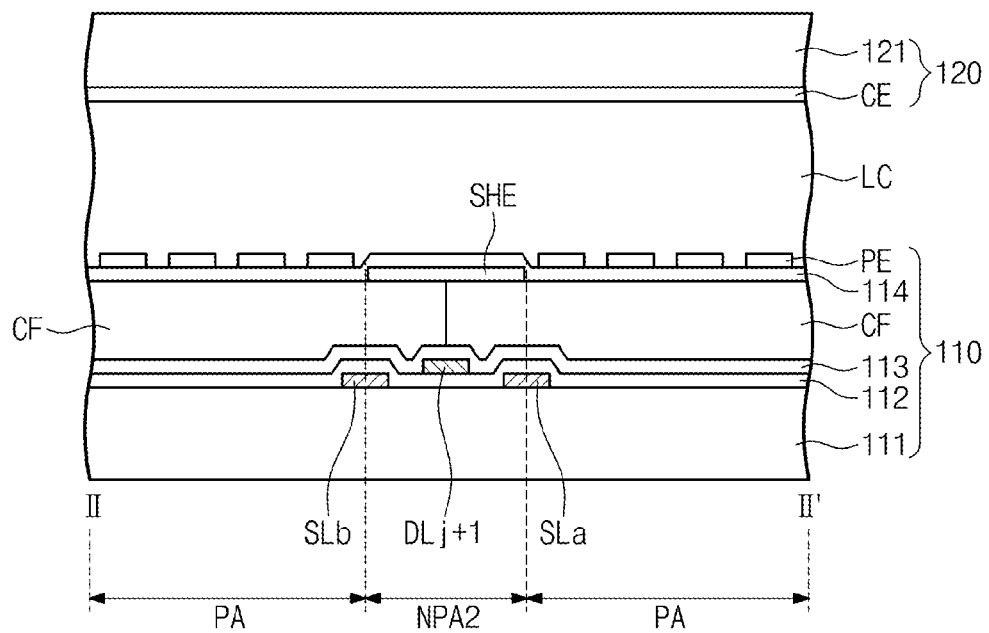
FIG. 5 is a cross-sectional view taken along a line II-IP of FIG. 2.

FIG. 4 is a cross-sectional view taken along a line I-I' of FIG. 2 and FIG. 5 is a cross-sectional view taken along a line II-II' of FIG. 2.

Referring to FIGS. 4 and 5, the pixel PX1j includes a first substrate 110, a second substrate 120 facing the first substrate 110, and the liquid crystal layer LC interposed between the first and second substrates 110 and 120.

The first substrate 110 includes a first base substrate 111 and the transistor Tr, the color filter CF, the shielding electrode SHE, the pixel electrode PE, and a black matrix BM, which are disposed on the first base substrate 111.

In detail, the gate electrode GE of the transistor Tr and the first and second branch electrodes SLa and SLb branched from the first storage line SL1 are disposed on the first base substrate 111. The first base substrate 111 may be a transparent insulating substrate or a non-transparent insulating substrate. For instance, the first base substrate 111 may be a silicon substrate, a glass substrate, or a plastic substrate.

A first insulating layer 112 is disposed on the first base substrate 111 to cover the gate electrode GE and the first and second branch electrodes SLa and SLb. The first insulating layer 112 serves as a gate insulating layer. The first insulating layer 112 may be an inorganic insulating layer including an inorganic material.

A semiconductor layer SM of the transistor Tr is disposed on the first insulating layer 112 which covers the gate electrode GE. Although not shown in figures, the semiconductor layer SM may include an active layer and an ohmic contact layer.

The source electrode SE and the drain electrode DE of the transistor Tr are disposed on the semiconductor layer SM and the first insulating layer 112, and the source electrode SE and the drain electrode DE are spaced apart from each other. In addition, the data line DLj+1 is disposed on the first insulating layer 112 in the second non-pixel area NPA2. The semiconductor layer SM forms a conductive channel between the source electrode SE and the drain electrode DE.

A second insulating layer 113 is disposed on the first insulating layer 112 to cover the transistor Tr and the data line DLj+1. The second insulating layer 113 serves as a passivation layer. The second insulating layer 113 may be an inorganic insulating layer including an inorganic material. The second insulating layer 113 covers an exposed upper portion of the semiconductor layer SM.

The color filters CF are disposed on the second insulating layer 113. As described above, the color filters CF extend in the second direction D2 and are overlapped with the pixel areas PA arranged in the second direction D2. As shown in FIGS. 4 and 5, the color filters CF may be disposed to make contact with each other in the second non-pixel area NPA2.

The color filter CF assigns a color to the light passing through the pixel. The color filter CF may be a red color filter, a green color filter, or a blue color filter. The color filters CF may be sequentially arranged in the first direction D1 in an order of the red, green, and blue color filters. However, the arrangement of the color filters CF should not be limited thereto or thereby. That is, the color filters CF may include a white color filter and may be arranged in various orders.

The shielding electrode SHE is disposed on the color filters CF in the second non-pixel area NPA2. The shielding electrode SHE has a width greater than that of the data line DLj+1 and is disposed to overlap with the second non-pixel area NPA2. A third insulating layer 114 is disposed on the color filter CF to cover the shielding electrode SHE. The third insulating layer 114 may be an inorganic insulating layer including an inorganic material.

The contact hole CH is formed penetrating through the third insulating layer 114, the color filter CF, and the second insulating layer 113 to extend to and expose a predetermined area of the drain electrode DE. The pixel electrode PE is disposed on the third insulating layer 114 in the pixel area PA. The connection electrode CNE branched from the pixel electrode PE is connected to the drain electrode DE of the transistor Tr through the contact hole CH.

The black matrix BM is disposed on the third insulating layer 114 in the first non-pixel area NPA1. The first non-pixel area NPA1 extending in the first direction D1 crosses the second non-pixel area NPA2 extending in the second direction D2. Thus, the black matrix BM is disposed not only in the first non-pixel area NPA1 but also in an area where the first non-pixel area NPA1 crosses the second non-pixel area NPA2.

The black matrix BM blocks the light that is unnecessary to display the image in the first non-pixel area NPA1. The black matrix BM may prevent a light leakage caused by malfunction of liquid crystal molecules in edges of the pixel area PA adjacent to the first non-pixel area NPA1. Also, the black matrix BM may prevent a color mixture occurring at edges of the color filters CF disposed adjacent to the first non-pixel area NPA1.

The second substrate 120 includes a second base substrate 121 and a common electrode CE disposed under the second base substrate 121 to face the pixel electrode PE. The second base substrate 121 may be a transparent insulating substrate or a non-transparent insulating substrate.

The common electrode CE may include a transparent conductive material. For instance, the common electrode CE may include a transparent conductive material, such as indium tin oxide (ITO), indium zinc oxide (IZO), indium tin zinc oxide (ITZO), etc.

Although not shown in figures, a backlight unit may be disposed under the display panel 110 to supply the light to the display panel 110.

The data voltage is applied to the pixel electrode PE through the transistor Tr. The common voltage is applied to the common electrode CE. The pixel electrode PE forms an electric field in cooperation with the common electrode CE by a voltage difference between the data voltage and the common voltage. The liquid crystal molecules of the liquid crystal layer LC are driven by the electric field formed between the pixel electrode PE and the common electrode CE. A light transmittance of the liquid crystal layer LC is controlled by the liquid crystal molecules driven by the electric field, and thus desired images are displayed.

Although not shown in figures, the pixel PX1j includes the transistor Tr and a liquid crystal capacitor and a storage capacitor, which are connected to the transistor Tr. The liquid crystal capacitor is formed by the pixel electrode PE, the common electrode CE, and the liquid crystal layer LC disposed between the pixel electrode PE and the common electrode CE. The storage capacitor is formed by the pixel electrode PE and the first and second branch electrodes SLa and SLb and the first storage line SL1, which are partially overlapped with the pixel electrode PE.

When the liquid crystal capacitor is charged with a pixel voltage corresponding to the voltage difference between the common voltage and the data voltage, the liquid crystal molecules of the liquid crystal layer LC are driven. The storage capacitor supplements the pixel voltage charged to the liquid crystal capacitor.

The common voltage is applied to the common electrode CE and the shielding electrode SHE. That is, the common electrode CE and the shielding electrode SHE receive the voltage at the same voltage level. Thus, the electric field is not formed between the shielding electrode SHE and the common electrode CE in the second non-pixel area NPA2.

Since the electric field is not formed in the second non-pixel area NPA2, the liquid crystal molecules of the liquid crystal layer LC are not driven in the second non-pixel area NPA2, and thus, the light traveling to the second non-pixel area NPA2 is blocked by the liquid crystal molecules. As a result, the second non-pixel area NPA2 blocks the light.

Even though the black matrix BM is not disposed in the second non-pixel area NPA2, the light is blocked by the shielding electrode SHE. Thus, the second non-pixel area NPA may be displayed in a black color.

Figure 6:
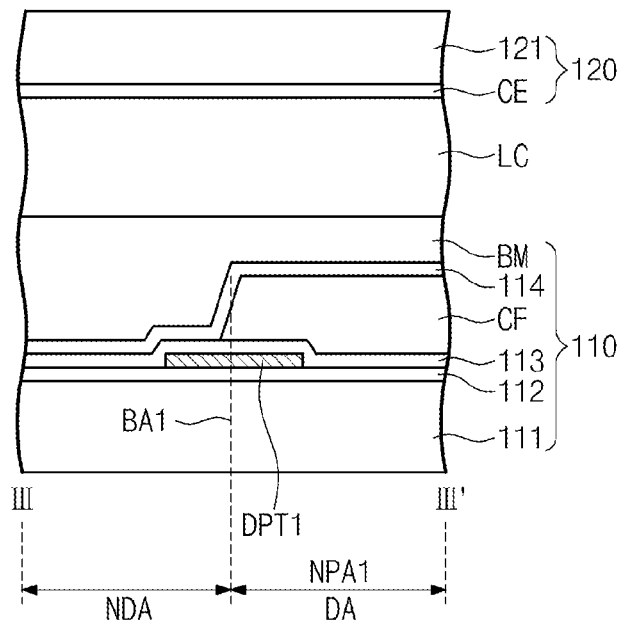
FIG. 6 is a cross-sectional view taken along a line III-III' of FIG. 2.
Figure 7:
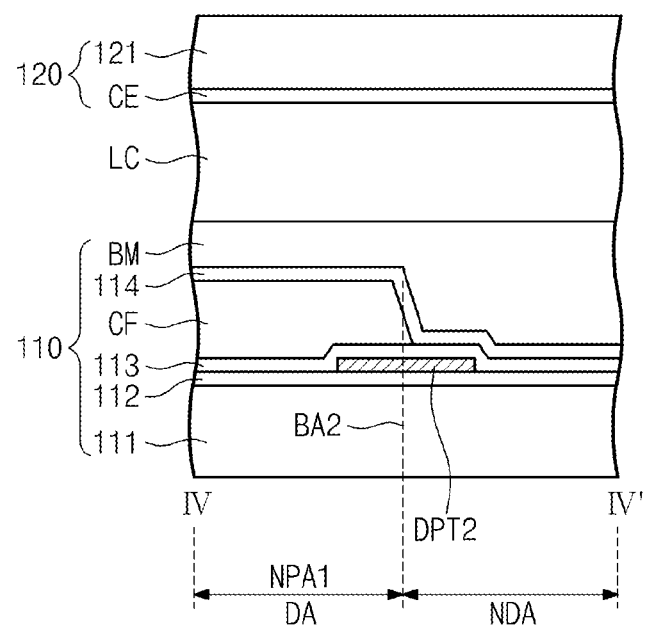
FIG. 7 is a cross-sectional view taken along a line IV-IV' of FIG. 3.

FIG. 6 is a cross-sectional view taken along a line of FIG. 2, and FIG. 7 is a cross-sectional view taken along a line IV-IV' of FIG. 3.

Referring to FIGS. 6 and 7, the first insulating layer 112 is disposed on the first base substrate 111. The first dummy pattern DPT1 is disposed on the first insulating layer 112 in the predetermined area of the first non-pixel area NPA1 adjacent to the first boundary area BA1 and in the predetermined area of the non-display area NDA adjacent to the first boundary area BA1.

The second dummy pattern DPT2 is disposed on the first insulating layer 112 in the predetermined area of the first non-pixel area NPA1 adjacent to the second boundary area BA2 and in the predetermined area of the non-display area NDA adjacent to the second boundary area BA2.

Referring to the data line DLj+1 shown in FIG. 3, the first and second dummy patterns DPT1 and DPT2 are disposed on the same layer as the data lines DLj, DLj+1, and DLj+2. In addition, the first and second dummy patterns DPT1 and DPT2 may include the same material as that of the data lines DLj, DLj+1, and DLj+2. That is, the first and second dummy patterns DPT1 and DPT2 may be substantially simultaneously patterned together with the data lines DLj, DLj+1, and DLj+2 and formed on the same layer as the data lines DLj, DLj+1, and DLj+2.

The second insulating layer 113 is disposed on the first insulating layer 112 to cover the first and second dummy patterns DPT1 and DPT2. A boundary surface of the color filter CF extending in the second direction D2 has a predetermined inclined angle and is disposed to overlap with the first boundary area BA1 and the second boundary area BA2.

The predetermined area of the color filter CF adjacent to the first boundary area BA1 is overlapped with the first dummy pattern DPT1 disposed in the predetermined area of the first non-pixel area NPA1 adjacent to the first boundary area BA1. The predetermined area of the color filter CF adjacent to the second boundary area BA2 is overlapped with the second dummy pattern DPT2 disposed in the predetermined area of the first non-pixel area NPA1 adjacent to the second boundary area BA2.

The third insulating layer 114 is disposed on the second insulating layer 113 in the display area DA and the non-display area NDA to cover the color filter CF. The black matrix BM disposed on the third insulating layer 114 may be disposed in the non-display area NDA.

Figure 8A:
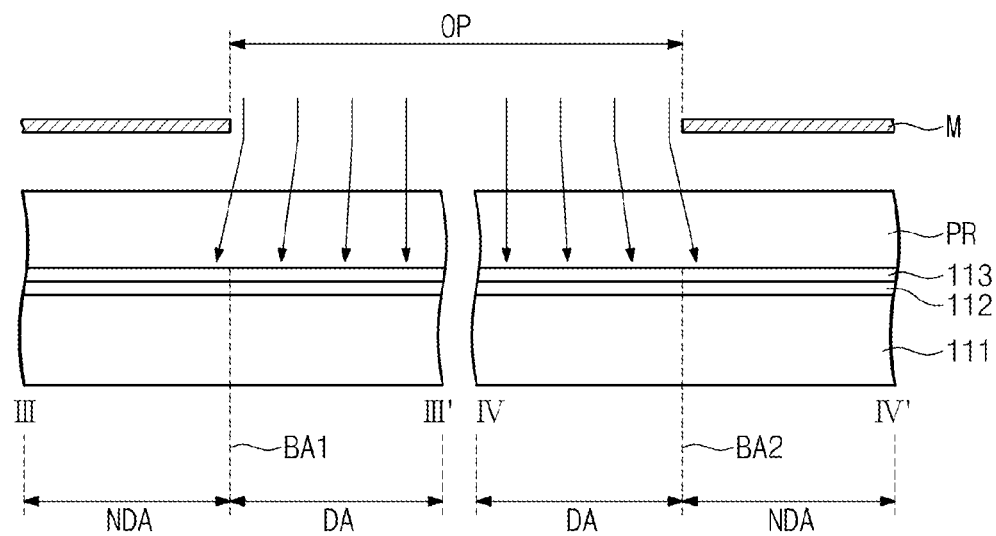
FIGS. 8A and 8B are cross-sectional views showing a manufacturing method of a color filter when no dummy pattern is provided on a first base substrate.
Figure 8B:
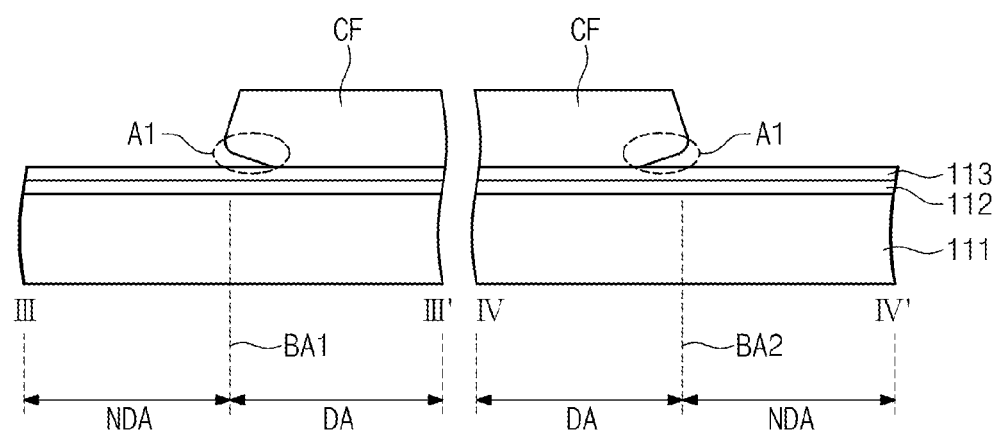

FIGS. 8A and 8B are cross-sectional views showing a manufacturing method of the color filter when no dummy pattern is provided on the first base substrate.

Referring to FIG. 8A, a photosensitive resin PR is disposed on the second insulating layer 113 to form the color filter CF. The photosensitive resin PR may be a negative type photosensitive resin PR.

A mask M including an opening portion OP formed therethrough to correspond to the display area DA is disposed on the photosensitive resin PR. The photosensitive resin PR is exposed to a light through the opening portion OP. The light may be provided to the non-display area NDA adjacent to the display area DA due to a refraction of the light during the exposure process.

As a light path transmitting through the photosensitive resin PR becomes longer, an amount of light provided to the photosensitive resin PR is reduced. That is, the amount of light becomes smaller as a distance from an upper surface of the photosensitive resin PR increases when viewed in a cross-sectional view.

In the non-display area NDA adjacent to the first and second boundary areas BA1 and BA2, the light is not incident perpendicular to the photosensitive resin PR due to the refraction of light. That is, the light is incident to the photosensitive resin PR with a predetermined inclined angle in the non-display area NDA adjacent to the first and second boundary areas BA1 and BA2. Therefore, the light path of the light incident to the photosensitive resin PR with the inclined angle is longer than the light path of the light incident perpendicular to the photosensitive resin PR.

Consequently, the amount of light provided to a bottom of the photosensitive resin PR disposed in the non-display area NDA adjacent to the first and second boundary areas BA1 and BA2 is the smallest.

Referring to FIG. 8B, when the photosensitive resin PR is developed, the photosensitive resin PR is etched and removed except for the exposed portion thereof. The color filter CF is formed by the photosensitive resin PR that remains on the second insulating layer 113. The amount of light provided to the photosensitive resin PR is referred to as a light exposure amount.

During the developing process, when the light exposure amount is greater than a predetermined threshold value, the photosensitive resin PR exposed to the light is remained without being removed. However, when the light exposure amount is smaller than the predetermined threshold value, the photosensitive resin PR is etched and removed. In addition, as the light exposure amount becomes smaller than the predetermined threshold value, an amount in the etching stage of the photosensitive resin PR remarkably increases.

Then, as shown in FIG. 8B, a lower portion of the photosensitive resin PR is over-etched in a first area A1 adjacent to the first and second boundary areas BA1 and BA2 to cause peeling of the color filter CF. That is, the lower portion of the photosensitive resin PR is etched in the non-display area NDA adjacent to the first and second boundary areas BA1 and BA2, and further, the photosensitive resin PR is etched in the display area DA adjacent to the first and second boundary areas BA1 and BA2.

Figure 9A:
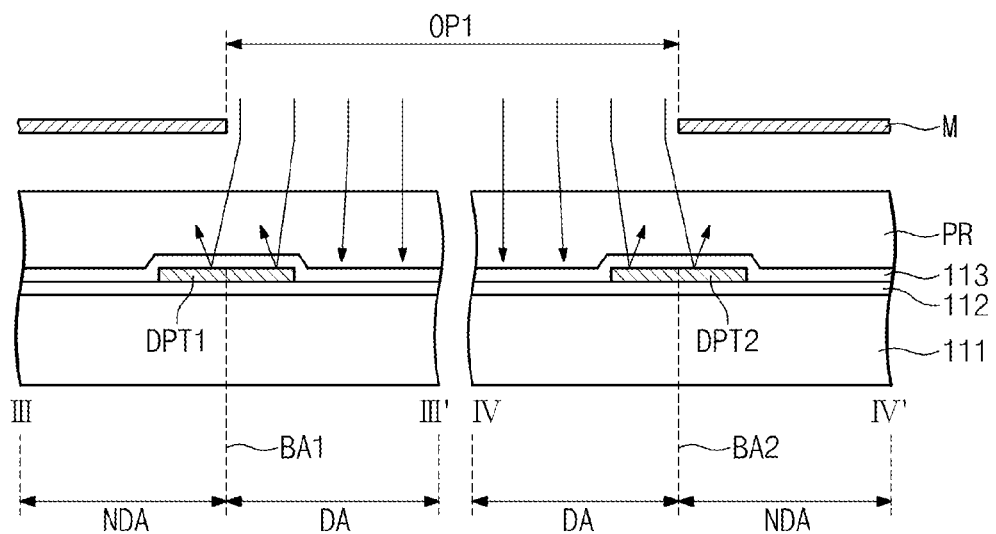
FIGS. 9A and 9B are cross-sectional views showing a manufacturing method of the color filter when the dummy pattern is provided on the first base substrate.
Figure 9B:
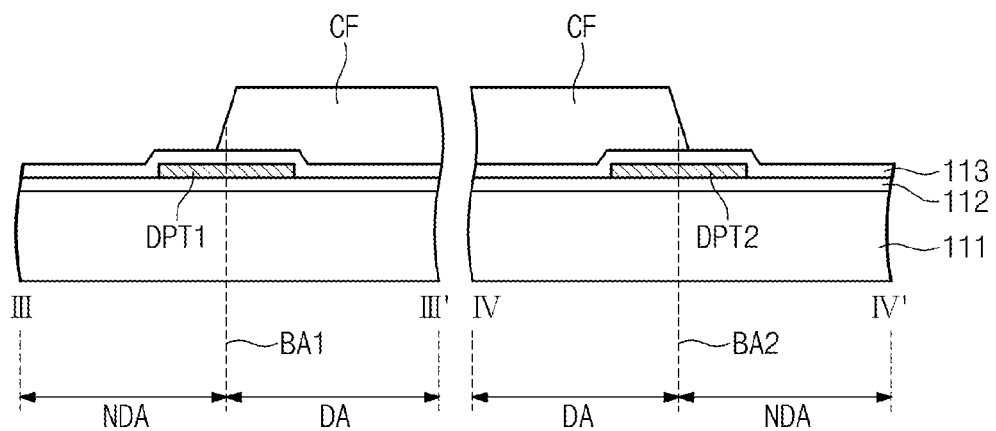

FIGS. 9A and 9B are cross-sectional views showing a manufacturing method of the color filter when the dummy pattern is provided on the first base substrate.

Referring to FIG. 9A, the light is provided to the non-display area NDA adjacent to the display area DA due to the refraction of light during the exposure process.

The light is incident to the photosensitive resin PR with the predetermined inclined angle without being incident perpendicular to the photosensitive resin PR in the non-display area NDA adjacent to the first and second boundary areas BA1 and BA2 due to the refraction of light. Therefore, the light path of the light incident to the photosensitive resin PR with the inclined angle is longer than the light path of the light incident perpendicular to the photosensitive resin PR.

The first and second dummy patterns DPT1 and DPT2 are disposed in the predetermined area of the display area DA and the predetermined area of the non-display area NDA in the first and second boundary areas BA1 and BA2. The first and second dummy patterns DPT1 and DPT2 may reflect the light.

The light passing through the photosensitive resin PR is reflected by the first and second dummy patterns DPT1 and DPT2 disposed under the photosensitive resin PR. Thus, the light is again provided to the lower portion of the photosensitive resin PR adjacent to the first and second boundary areas BA1 and BA2 by the first and second dummy patterns DPT1 and DPT2.

That is, the light is again provided to the lower portion of the photosensitive resin PR disposed in the non-display area NDA adjacent to the first and second boundary areas BA1 and BA2. As a result, the amount of light incident to the lower portion of the photosensitive resin PR disposed in the non-display area NDA adjacent to the first and second boundary areas BA1 and BA2 may increase.

Referring to FIG. 9B, when the photosensitive resin PR is developed, the photosensitive resin PR is etched and removed except for the exposed portion thereof. The color filter CF is formed by photosensitive resin PR that remains on the second insulating layer 113.

Since the light exposure amount increases in the lower portion of the photosensitive resin PR disposed in the non-display area NDA adjacent to the first and second boundary areas BA1 and BA2, the photosensitive resin PR is prevented from being over-etched. That is, since the photosensitive resin PR is removed without being over-etched during the developing process, the boundary surface of the color filter CF may have the predetermined inclined surface overlapped with the first and second boundary areas BA1 and BA2. Thus, as shown in FIG. 9B, the peeling of the color filter CF may be prevented.

As a result, the display apparatus 500 according to the present disclosure may prevent the peeling of the color filter CF.

Figure 10:
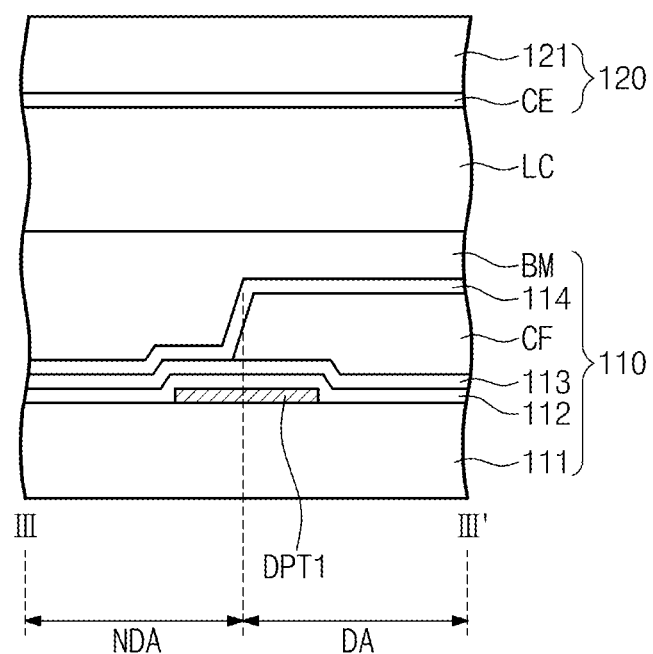
FIG. 10 is a cross-sectional view showing the dummy pattern having a different structure from the dummy pattern shown in FIG. 2.

FIG. 10 is a cross-sectional view showing the dummy patterns having a different structure from the dummy patterns shown in FIG. 2.

Referring to FIG. 10, the first dummy pattern DPT1 is disposed on the first base substrate 111. That is, the first dummy pattern DPT1 is disposed on the same layer as the gate electrode GE. The gate electrode GE is branched from the first gate line GL1. Thus, the first dummy patterns DPT1 are disposed on the same layer as the gate lines GL1 to GLn.

In addition, the first dummy patterns DPT1 may include the same material as that of the gate lines GL1 to GLn. That is, the first dummy patterns DPT1 may be substantially simultaneously patterned and formed together with the gate lines GL1 to GLn on the same layer.

Although not shown in figures, the second dummy patterns DPT2 may be formed using the same process as the first dummy patterns DPT1. That is, the second dummy patterns DPT2 are substantially simultaneously patterned and formed together with the gate lines GL1 to GLn on the same layer. The first and second dummy patterns DPT1 and DPT2 may include a metal material that reflects the light.

Details on how to prevent the peeling of the color filter CF by the first and second dummy patterns DPT1 and DPT2 are the same as described earlier, and thus it will be omitted here.

Figure 11:
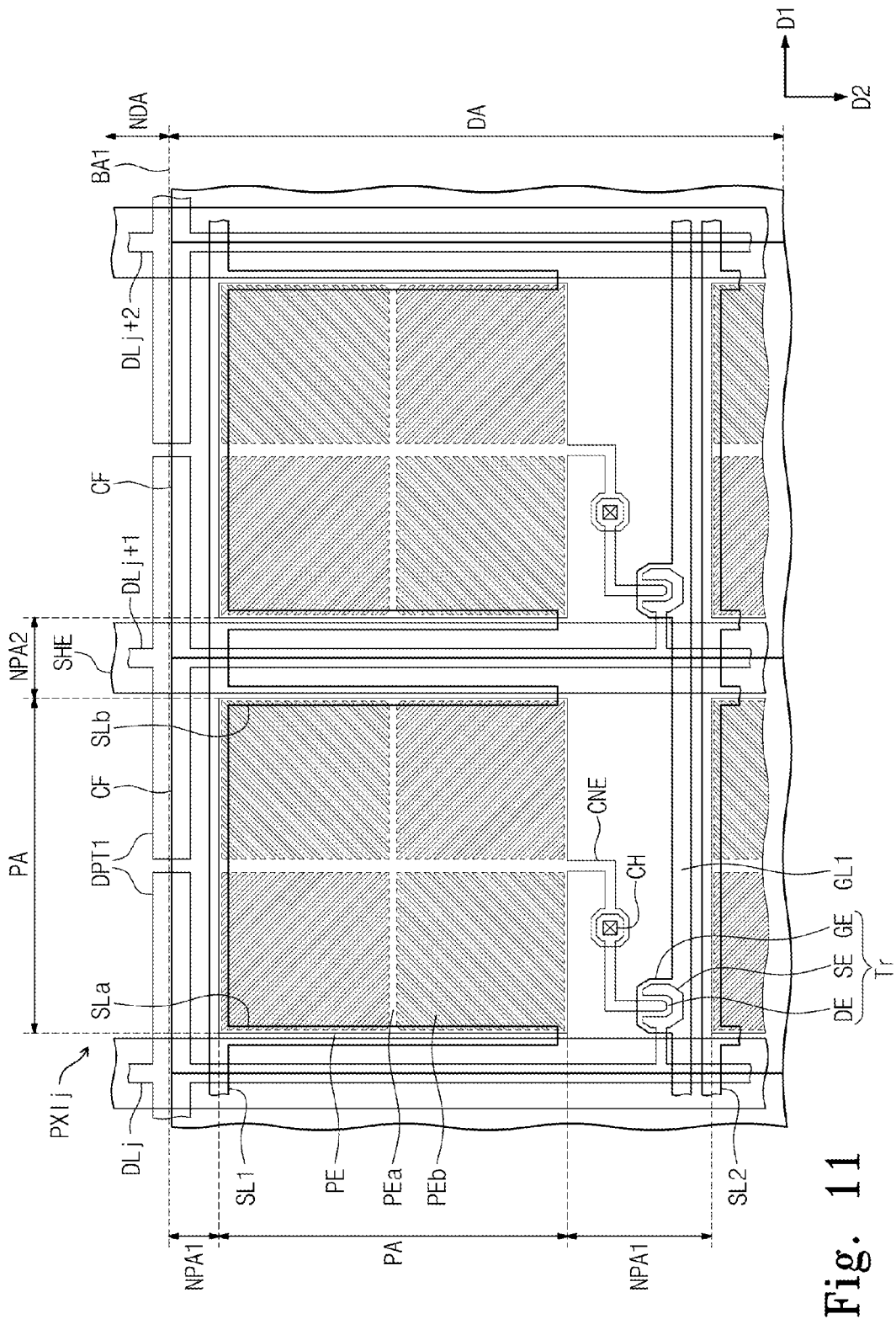
FIGS. 11 and 12 are plan views showing pixels of a display apparatus according to a second exemplary embodiment of the present disclosure.
Figure 12:
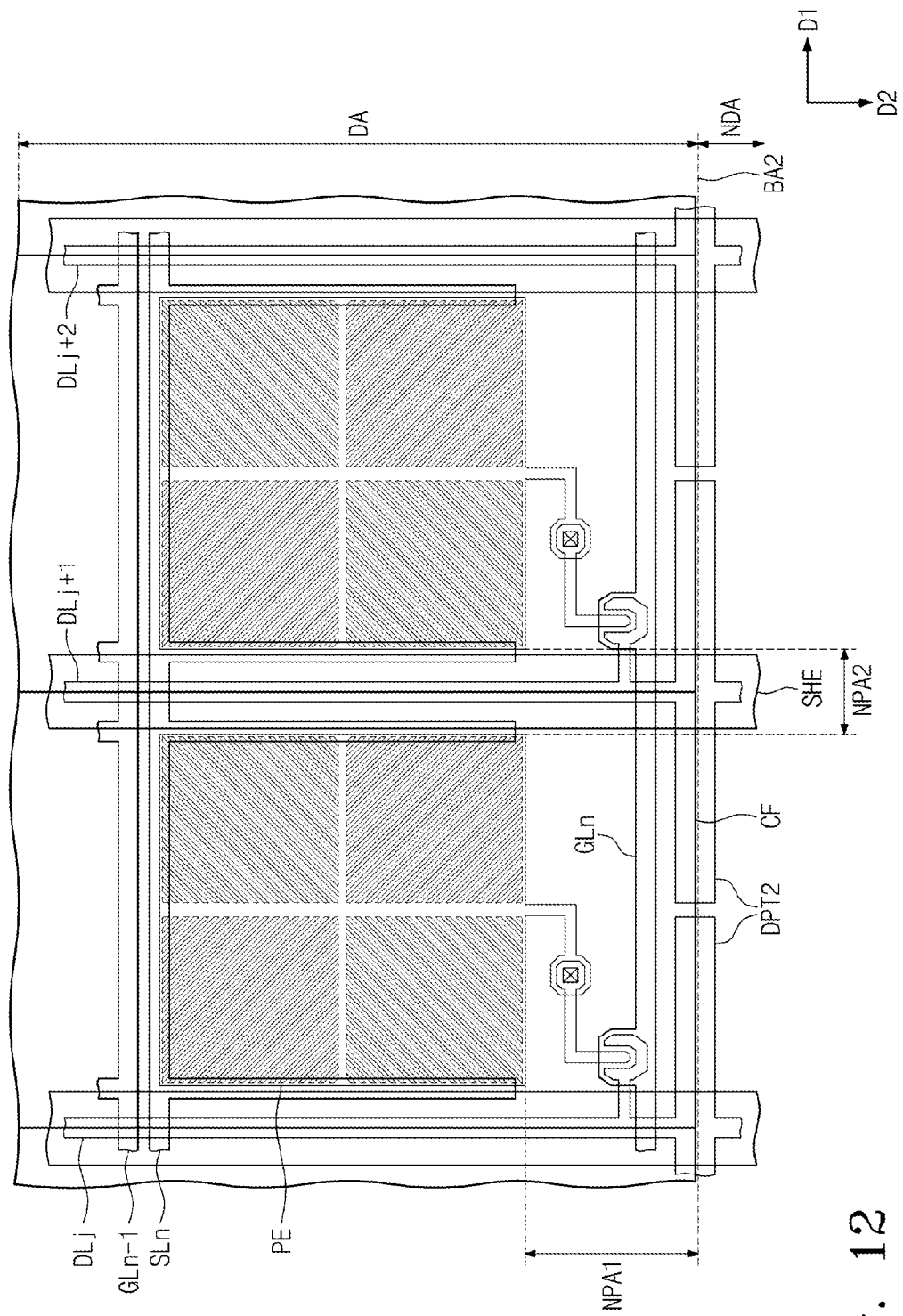

FIGS. 11 and 12 are plan views showing pixels of a display apparatus according to a second exemplary embodiment of the present disclosure.

FIG. 11 is a plan view showing the pixels disposed in an upper portion of a display area DA of a display panel, and FIG. 12 is a plan view showing the pixels disposed in a lower portion of the display area DA of the display panel.

The display panel shown in FIGS. 11 and 12 has the same structure and function as those of the display panel 100 shown in FIGS. 2 and 3 except for the structure of first and second dummy patterns DPT1 and DPT2. Thus, hereinafter, descriptions will be focused on the structure of the first and second dummy patterns with reference to FIGS. 11 and 12.

Hereinafter, the term of "first direction D1" means both directions, e.g., the first direction D1 and an opposite direction to the first direction D1, and hereinafter, the first direction D1 and the opposite direction to the first direction D1 may be referred to as left and right directions, respectively. In addition, the term of "second direction D2" means both directions, e.g., the second direction D2 and an opposite direction to the second direction D2, and hereinafter, the second direction D2 and the opposite direction to the second direction D2 may be referred to as upper and lower directions, respectively.

Referring to FIGS. 11 and 12, first and second dummy patterns DPT1 and DPT2 are branched from data lines DLj, DLj+1 and DLj+2 and extend in a first direction D1. That is, the first and second dummy patterns DPT1 and DPT2 are branched from each of the data lines DLj, DLj+1, and DLj+2 and extend in left and right directions, i.e., the first direction D1 and the opposite direction to the first direction D1.

The first dummy patterns DPT1 are disposed in a predetermined area of a first non-pixel area NPA1 adjacent to a first boundary area BA1 and in a predetermined area of a non-display area NDA adjacent to the first boundary area BA1.

A predetermined area in an upper portion of color filters CF disposed adjacent to the first boundary area BA1 is overlapped with the first dummy patterns DPT1 disposed in the predetermined area of the first non-pixel area NPA1 adjacent to the first boundary area BA1.

The second dummy patterns DPT2 are disposed in a predetermined area of the first non-pixel area NPA1 adjacent to a second boundary area BA2 and a predetermined area of the non-display area NDA adjacent to the second boundary area BA2.

A predetermined area in a lower portion of the color filters CF disposed adjacent to the second boundary area BA2 is overlapped with the second dummy patterns DPT2 disposed in the predetermined area of the first non-pixel area NPA1 adjacent to the second boundary area BA2.

The first and second dummy patterns DPT1 and DPT2 may include a metal material that reflects a light. Thus, the peeling of the color filter CF may be prevented by the first and second dummy patterns DPT1 and DPT2.

As a result, the display apparatus according to the second exemplary embodiment may prevent the peeling phenomenon of the color filter CF.

Figure 13:
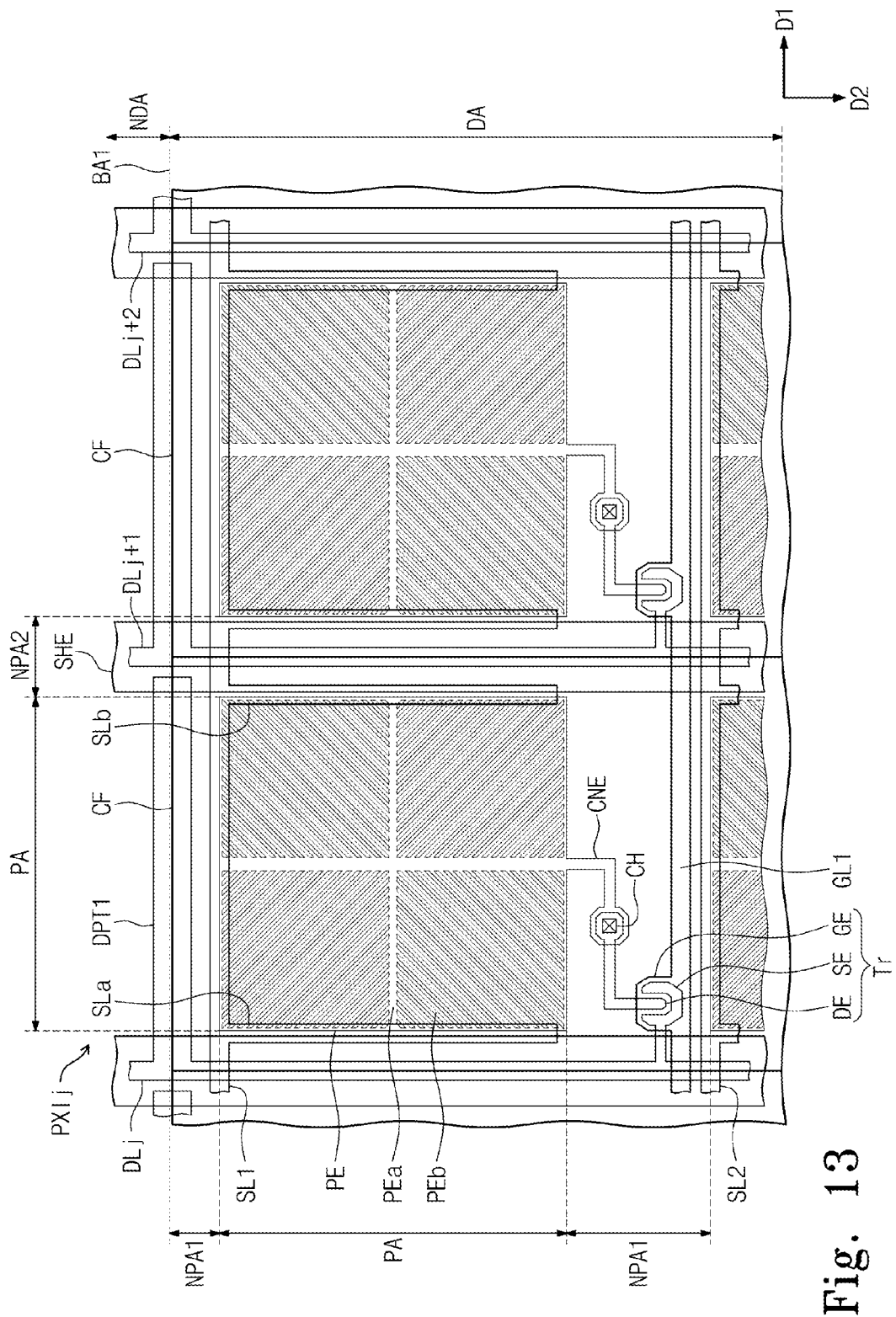
FIGS. 13 and 14 are plan views showing pixels of a display apparatus according to a third exemplary embodiment of the present disclosure.
Figure 14:
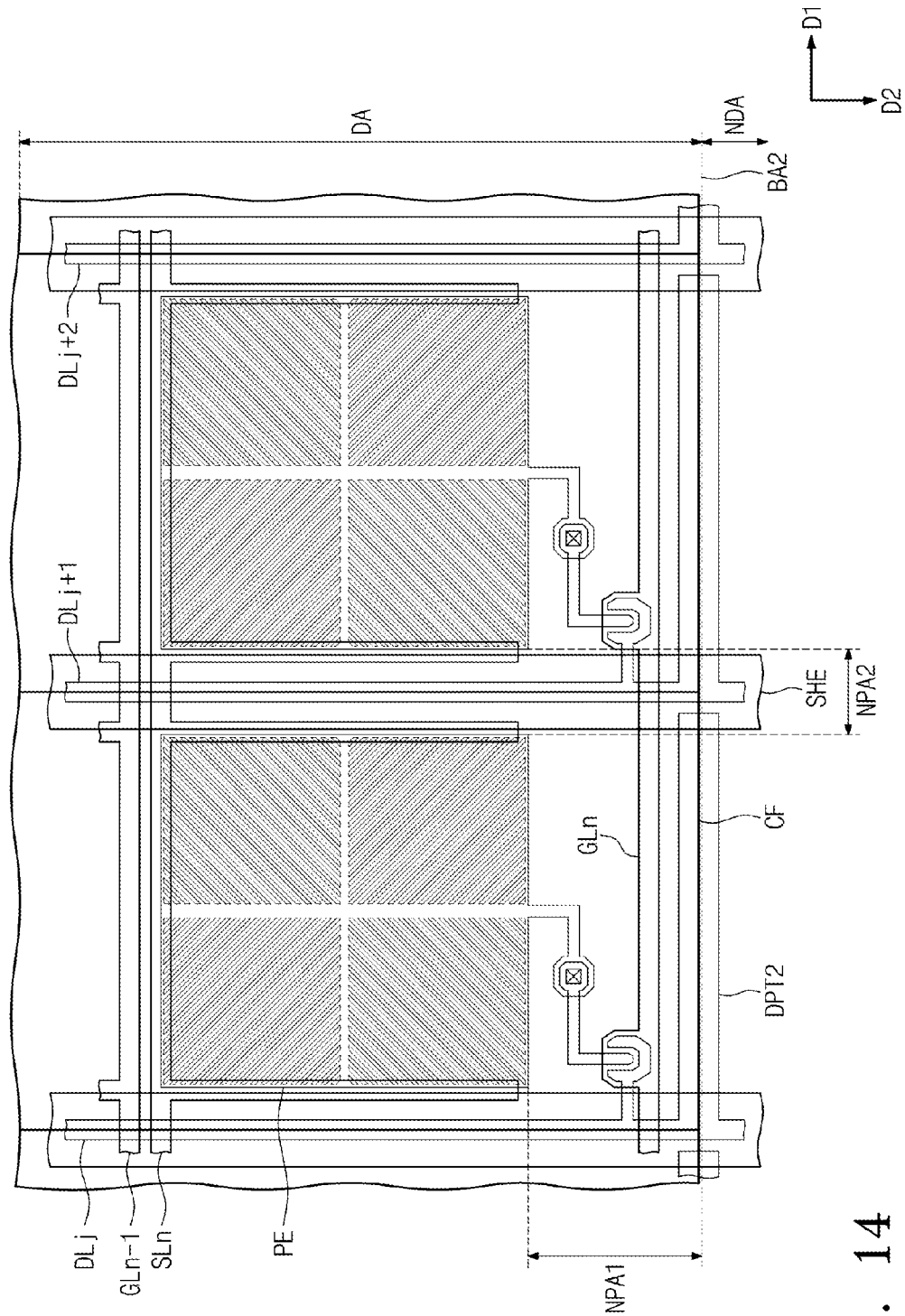

FIGS. 13 and 14 are plan views showing pixels of a display apparatus according to a third exemplary embodiment of the present disclosure.

FIG. 13 is a plan view showing the pixels disposed in an upper portion of a display area DA of a display panel, and FIG. 14 is a plan view showing the pixels disposed in a lower portion of the display area DA of the display panel.

The display panel shown in FIGS. 13 and 14 has the same structure and function as those of the display panel 100 shown in FIGS. 2 and 3 except for the structure of first and second dummy patterns DPT1 and DPT2. Thus, descriptions will be focused on the structure of the first and second dummy patterns with reference to FIGS. 13 and 14.

Referring to FIGS. 13 and 14, first and second dummy patterns DPT1 and DPT2 are branched from each data line DLj, DLj+1 and DLj+2 and extend in the right direction, i.e., the first direction D1. However, it should not be limited thereto or thereby. That is, the first and second dummy patterns DPT1 and DPT2 may be branched from each of the data lines DLj, DLj+1, and DLj+2 and extend in the left direction, i.e., the opposite direction to the first direction D1.

The first dummy patterns DPT1 are disposed in a predetermined area of a first non-pixel area NPA1 adjacent to a first boundary area BA1 and a predetermined area of a non-display area NDA adjacent to the first boundary area BA1.

A predetermined area in an upper portion of color filters CF disposed adjacent to the first boundary area BA1 is overlapped with the first dummy patterns DPT1 disposed in the predetermined area of the first non-pixel area NPA1 adjacent to the first boundary area BA1.

The second dummy patterns DPT2 are disposed in a predetermined area of the first non-pixel area NPA1 adjacent to a second boundary area BA2 and a predetermined area of the non-display area NDA adjacent to the second boundary area BA2.

A predetermined area in a lower portion of the color filters CF disposed adjacent to the second boundary area BA2 is overlapped with the second dummy patterns DPT2 disposed in the predetermined area of the first non-pixel area NPA1 adjacent to the second boundary area BA2.

The first and second dummy patterns DPT1 and DPT2 may include a metal material that reflects a light. Thus, peeling of the color filter CF may be prevented by the first and second dummy patterns DPT1 and DPT2.

As a result, the display apparatus according to the third exemplary embodiment may prevent the peeling phenomenon of the color filter CF.

Figure 15:
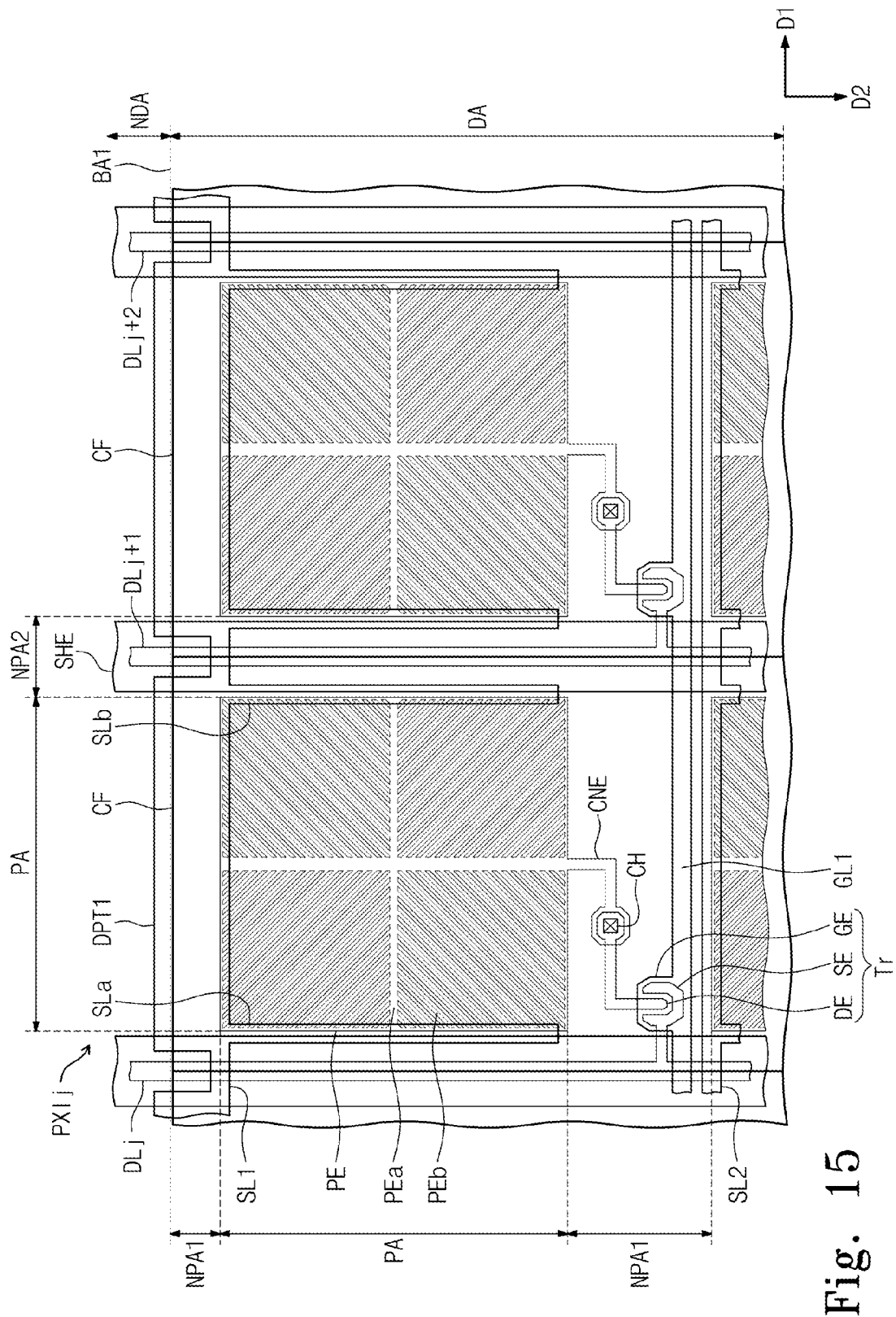
FIGS. 15 and 16 are plan views showing pixels of a display apparatus according to a fourth exemplary embodiment of the present disclosure.
Figure 16:
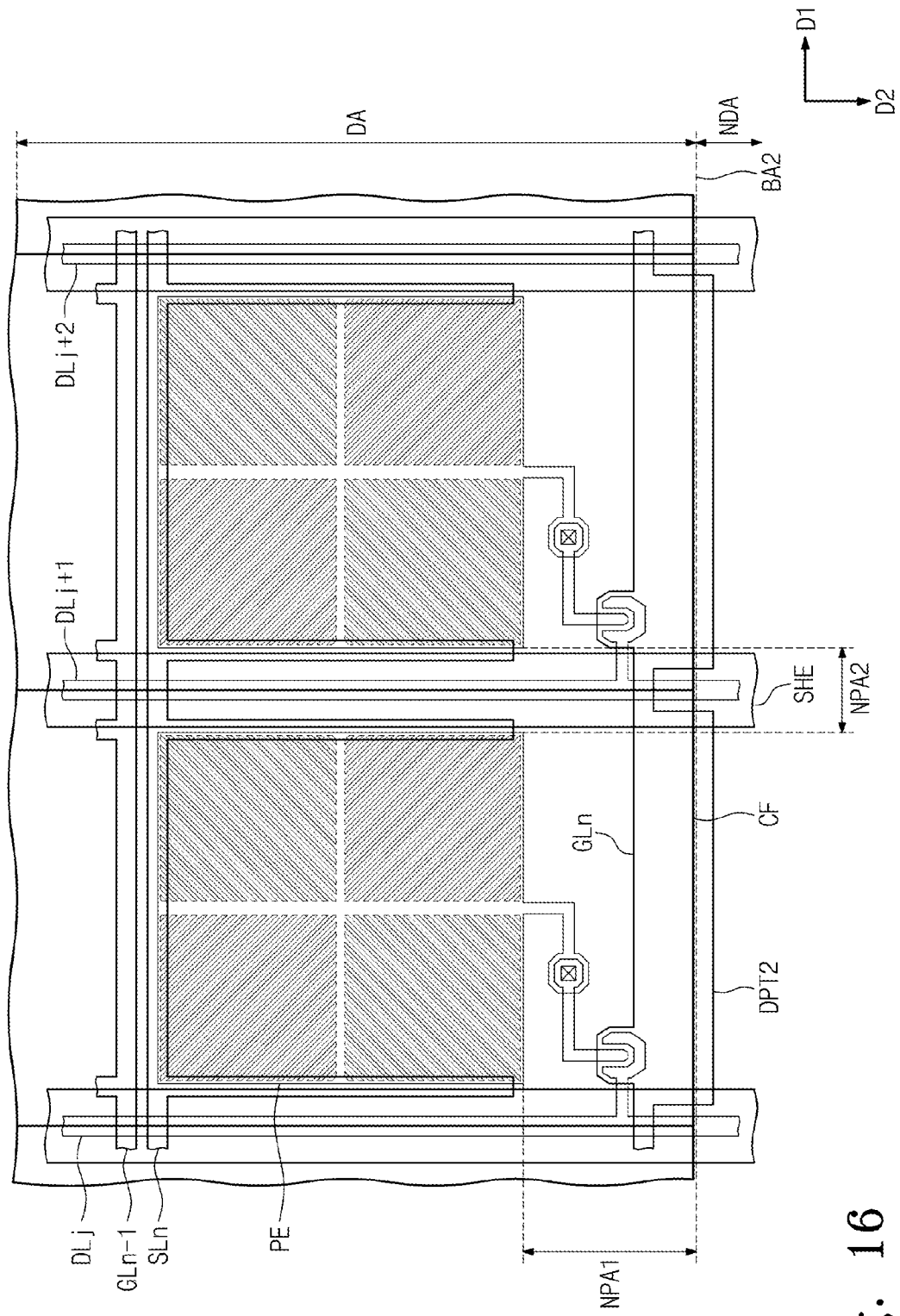

FIGS. 15 and 16 are plan views showing pixels of a display apparatus according to a fourth exemplary embodiment of the present disclosure.

FIG. 15 is a plan view showing the pixels disposed in an upper portion of a display area DA of a display panel, and FIG. 16 is a plan view showing the pixels disposed in a lower portion of the display area DA of the display panel.

The display panel shown in FIGS. 15 and 16 has the same structure and function as those of the display panel 100 shown in FIGS. 2 and 3 except for the structure of first and second dummy patterns DPT1 and DPT2. Thus, descriptions will be focused on the structure of the first and second dummy patterns DPT1 and DPT2 with reference to FIGS. 15 and 16.

Referring to FIGS. 15 and 16, first dummy patterns DPT1 are branched from a first storage line SL1 disposed in the upper portion of a display area DA and extend in the upper direction, i.e., the opposite direction to the second direction D2. The first storage line SL1 corresponds to a first storage line of storage lines SL1 to SLn.

Second dummy patterns DPT2 are branched from an n-th gate line GLn disposed in the lower portion of the display area DA and extend in the lower direction, i.e., the second direction D2. The n-th gate line GLn corresponds to a last gate line of the gate lines GL1 to GLn.

The first dummy patterns DPT1 are disposed in a predetermined area of a first non-pixel area NPA1 adjacent to a first boundary area BA1 and a predetermined area of a non-display area NDA adjacent to the first boundary area BA1.

A predetermined area in the upper portion of color filters CF disposed adjacent to the first boundary area BA1 is overlapped with the first dummy patterns DPT1 disposed in the predetermined area of the first non-pixel area NPA1 adjacent to the first boundary area BA1.

The second dummy patterns DPT2 are disposed in the predetermined area of the first non-pixel area NPA1 adjacent to the second boundary area BA2 and the predetermined area of the non-display area NDA adjacent to the second boundary area BA2.

A predetermined area in the lower portion of the color filters CF disposed adjacent to the second boundary area BA2 is overlapped with the second dummy patterns DPT2 disposed in the predetermined area of the first non-pixel area NPA1 adjacent to the second boundary area BA2.

The first and second dummy patterns DPT1 and DPT2 may include a metal material that reflects a light. Thus, the peeling of the color filter CF may be prevented by the first and second dummy patterns DPT1 and DPT2.

As a result, the display apparatus according to the fourth exemplary embodiment may prevent the peeling phenomenon of the color filter CF.

Figure 17:
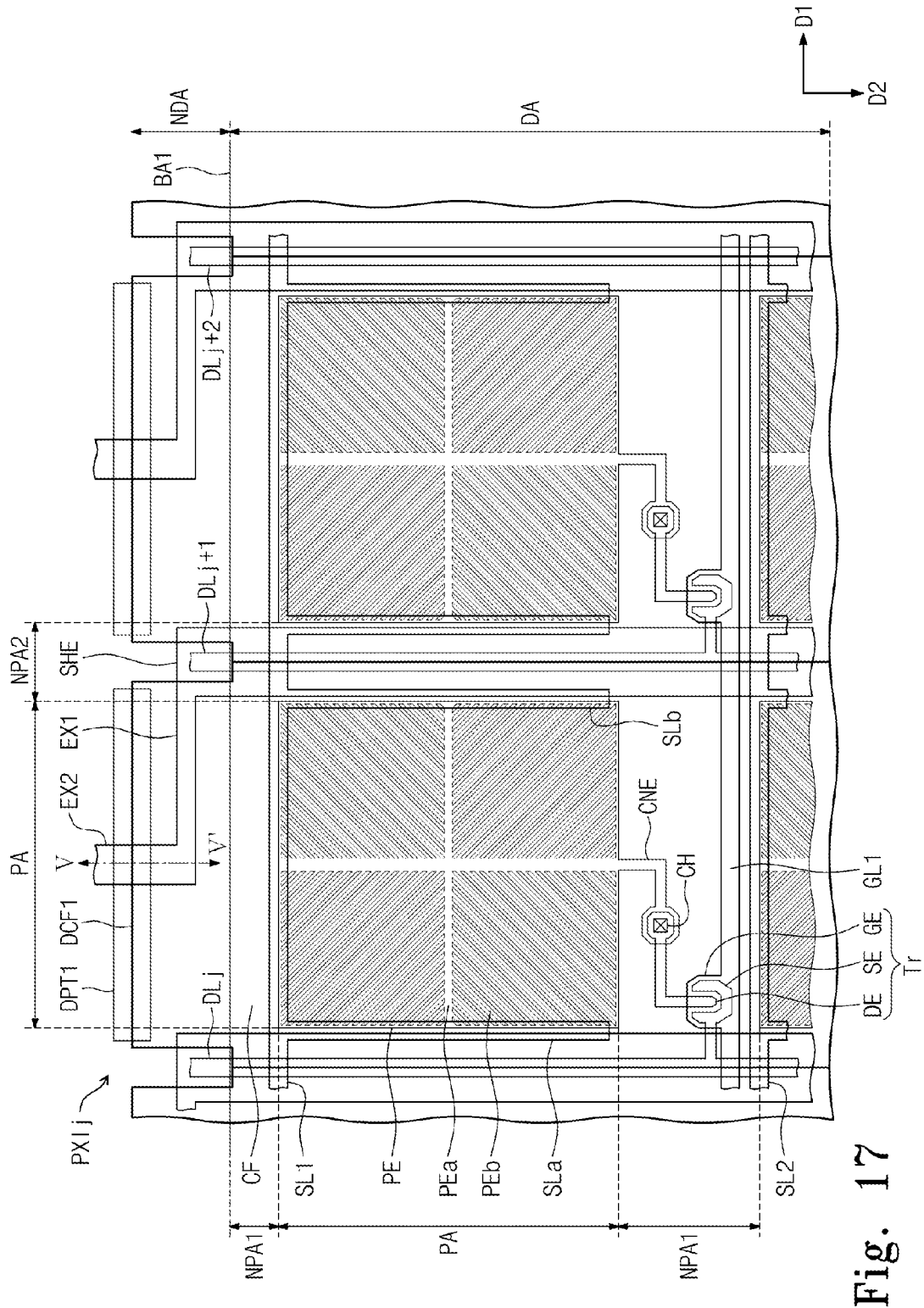
FIGS. 17 and 18 are plan views showing pixels of a display apparatus according to a fifth exemplary embodiment of the present disclosure.
Figure 18:
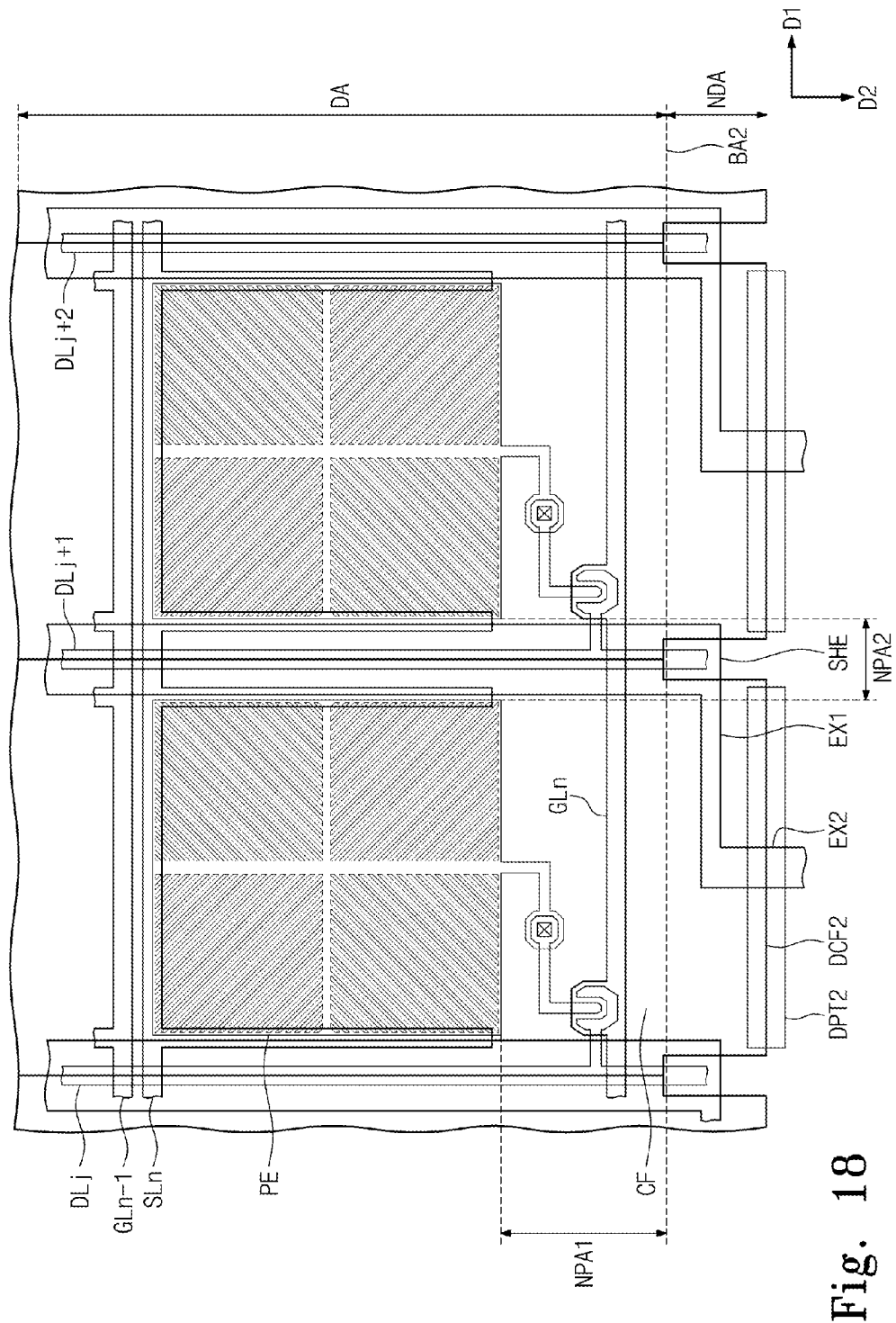
Figure 19:
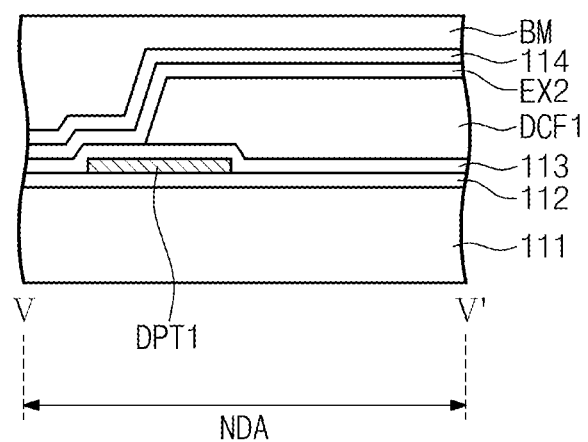
FIG. 19 is a cross-sectional view taken along a line V-V' of FIG. 17.

FIGS. 17 and 18 are plan views showing pixels of a display apparatus according to a fifth exemplary embodiment of the present disclosure, and FIG. 19 is a cross-sectional view taken along a line V-V' of FIG. 17.

FIG. 17 is a plan view showing the pixels disposed in the upper portion of a display area DA of a display panel, and FIG. 18 is a plan view showing the pixels disposed in the lower portion of the display area DA of the display panel.

The display panel shown in FIGS. 17 and 18 has the same structure and function as those of the display panel 100 shown in FIGS. 2 and 3 except for the structure of first and second dummy patterns DPT1 and DPT2, color filters CF, and a shielding electrode SHE. Thus, descriptions will be focused on the structure of the first and second dummy patterns DPT1 and DPT2, the color filters CF, and the shielding electrode SHE with reference to FIGS. 17 and 18.

Referring to FIGS. 17 and 18, dummy patterns DPT1 and DPT2 include a plurality of first dummy patterns DPT1 and a plurality of second dummy patterns DPT2 extending in a first direction D1 and disposed in a non-display area NDA.

The first dummy patterns DPT1 are disposed in the non-display area NDA adjacent to the upper portion of the display area DA in a second direction D2. The second dummy patterns DPT2 are disposed in the non-display area NDA adjacent to the lower portion of the display area DA.

Color filters CF extend in the second direction D2 and are disposed to overlap with the pixels arranged in the second direction D2.

The display panel according to the present exemplary embodiment of the present disclosure further includes a plurality of dummy color filters DCF1 and DCF2 extending from the color filters CF respectively in the second direction D2 and disposed in the non-display area NDA. That is, the color filters CF may extend to the non-display area NDA in the second direction D2. The first and second dummy patterns DPT1 and DPT2 are partially overlapped with corresponding dummy color filters DCF1 and DCF2.

In detail, the dummy color filters DCF1 and DCF2 include a plurality of first dummy color filters DCF1 and a plurality of second dummy color filters DCF2. The first dummy color filters DCF1 are disposed in the non-display area NDA adjacent to the upper portion of the display area DA. The second dummy color filters DCF2 are disposed in the non-display area NDA adjacent to the lower portion of the display area DA.

A predetermined area in an upper portion of the first dummy color filters DCF1 is partially overlapped with a corresponding first dummy pattern DPT1 of the first dummy patterns DPT1. A predetermined area in a lower portion of the second dummy color filters DCF2 is partially overlapped with a corresponding second dummy pattern DPT2 of the second dummy patterns DPT2.

The first and second dummy patterns DPT1 and DPT2 may include a metal material that reflects a light. Thus, the peeling of the first and second dummy color filters DCF1 and DCF2 may be prevented by the first and second dummy patterns DPT1 and DPT2.

The first and second dummy patterns DPT1 and DPT2 may include the same material as that of the data line DLj and formed on the same layer as the data line DLj, but it should not be limited thereto or thereby. That is, the first and second dummy patterns DPT1 and DPT2 may include the same material as that of the first gate line GL1 and formed on the same layer as the first gate line GL1.

A shielding electrode SHE extends to the non-display area NDA disposed adjacent to the upper and lower portions of the display area DA. The shielding electrode SHE extends to the non-display area NDA disposed adjacent to the upper and lower portions of the display area DA via an upper surface of a corresponding first dummy color filter DCF1 and a lower surface of a corresponding second dummy color filter DCF2.

Particularly, the shielding electrode SHE extending to the non-display area NDA disposed adjacent to the upper and lower portions of the display area DA includes a first extending portion EX1 and a second extending portion EX2.

In the non-display area NDA disposed adjacent to the upper portion of the display area DA, the first extending portion EX1 of the shielding electrode SHE extends in the first direction D1 to overlap with the corresponding first dummy color filter DCF1.

In the non-display area NDA disposed adjacent to the upper portion of the display area DA, the second extending portion EX2 of the shielding electrode SHE extends in the second direction D2 from an end of the first extending portion EX1 via the upper surface of the corresponding first dummy color filter DCF1.

In the non-display area NDA disposed adjacent to the lower portion of the display area DA, the first extending portion EX1 of the shielding electrode SHE extends in the first direction D1 to overlap with the corresponding second dummy color filter DCF2.

In the non-display area NDA disposed adjacent to the lower portion of the display area DA, the second extending portion EX2 of the shielding electrode SHE extends in the second direction D2 from an end portion of the first extending portion EX1 via the lower surface of the corresponding second dummy color filter DCF2.

Referring to FIG. 19, the second extending portion EX2 of the shielding electrode SHE is disposed on the first dummy color filter DCF1 in the non-display area NDA adjacent to the upper portion of the display area DA. In addition, the second extending portion EX2 extends via the upper surface of the first dummy color filter DCF1 in the non-display area NDA adjacent to the upper portion of the display area DA.

Although not shown in figures, the second extending portion EX2 may extend via the lower surface of the second dummy color filter DCF2 in the non-display area NDA adjacent to the lower portion of the display area DA.

In a case that the shielding electrode SHE is disposed via the surface of the color filter CF in which the peeling occurs, the shielding electrode SHE may be disconnected in the area where the peeling occurs. That is, as shown in FIG. 8B, the shielding electrode SHE may not be normally formed in the boundary surface of the color filter CF due to the first area A1 where the peeling occurs.

However, since the first and second dummy color filters DCF1 and DCF2 according to the present disclosure may be prevented from peeling, the surfaces of the first and second dummy color filters DCF1 and DCF2 may present a normally inclined surface. When the shielding electrode SHE extends via the surfaces of the first and second dummy color filters DCF1 and DCF2 with the normally inclined surface, the shielding electrode SHE may be prevented from being disconnected.

As a result, the display apparatus according to the fifth exemplary embodiment may prevent the peeling of the color filter CF and the shielding electrode SHE may be prevented from being disconnected.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

What is claimed is:

1. A display apparatus comprising:
   a display panel that includes a display area in which a plurality of pixels is disposed and a non-display area disposed adjacent to the display area;
   a plurality of dummy patterns that extends in a first direction and is disposed in a predetermined area of the display area and a predetermined area of the non-display area at a boundary area between the display area and the non-display area; and
   a plurality of color filters that extends in a second direction substantially perpendicular to the first direction in the display area to overlap with the pixels arranged in the second direction,
   wherein a predetermined area of the color filters adjacent to the non-display area in the second direction is partially overlapped with a corresponding dummy pattern of the dummy patterns.

2. The display apparatus of claim 1, wherein the dummy patterns comprise a metal material that reflects a light.

3. The display apparatus of claim 1, wherein the display area comprises:
   a pixel area corresponding to each pixel;
   a first non-pixel area disposed adjacent to the pixel area and extending in the first direction; and
   a second non-pixel area disposed adjacent to the pixel area and extending in the second direction, and a predetermined area of the dummy patterns is disposed in a predetermined area of the first non-pixel area in an upper portion of the display area and in a predetermined area of the first non-pixel area in a lower portion of the display area.

4. The display apparatus of claim 3, wherein the dummy patterns comprise:
   a plurality of first dummy patterns disposed in the predetermined area of the first non-pixel area adjacent to a first boundary area corresponding to a boundary between the upper portion of the display area and the non-display area in the second direction and being disposed in the predetermined area of the non-display area; and
   a plurality of second dummy patterns disposed in the predetermined area of the first non-pixel area adjacent to a second boundary area corresponding to a boundary between the lower portion of the display area and the non-display area and being disposed in the predetermined area of the non-display area.

5. The display apparatus of claim 4, wherein a center portion of the first dummy patterns is overlapped with the first boundary area in the second direction, and a center portion of the second dummy patterns is overlapped with the second boundary area in the second direction.

6. The display apparatus of claim 4, wherein a predetermined area in an upper portion of the color filters disposed adjacent to the first boundary area is overlapped with the first dummy patterns disposed in the predetermined area of the first non-pixel area adjacent to the first boundary area, and a predetermined area in a lower portion of the color filters disposed adjacent to the second boundary area is overlapped with the second dummy patterns disposed in the predetermined area of the first non-pixel area adjacent to the second boundary area.

7. The display apparatus of claim 3, wherein each pixel comprises:
   a pixel electrode disposed in the pixel area;
   a gate line disposed in the first non-pixel area and extending in the first direction;

a data line disposed in the second non-pixel area and extending in the second direction, the data line being insulated from the gate line while crossing the gate line; and a thin film transistor connected to the pixel electrode, the gate line, and the data line.

8. The display apparatus of claim 7, wherein the dummy patterns are disposed between the data lines.

9. The display apparatus of claim 7, wherein the dummy patterns are branched from each of the data lines and extend in both directions respectively corresponding to the first direction and an opposite direction to the first direction.

10. The display apparatus of claim 7, wherein the dummy patterns are branched from each of the data lines and extend in a right direction corresponding to the first direction.

11. The display apparatus of claim 7, wherein the dummy patterns are branched from each of the data lines and extend in a left direction corresponding to the opposite direction to the first direction.

12. The display apparatus of claim 7, wherein the dummy patterns comprise a same material as the data line and are disposed on a same layer as the data line.

13. The display apparatus of claim 7, wherein the dummy patterns comprise a same material as the gate line and are disposed on a same layer as the gate line.

14. The display apparatus of claim 7, wherein each pixel further comprises:
a storage line extending in the first direction and disposed to face the gate line while the pixel area is interposed between the storage line and the gate line;
first and second branch electrodes branched from the storage line and extending in the second direction to be spaced apart from each other;
a shielding electrode extending in the second direction and disposed in the second non-pixel area, the shielding electrode having a width greater than a width of the data line in the first direction; and
a black matrix disposed in the first non-pixel area, the storage line is disposed in the upper portion of the display area, and the first and second branch electrodes and the storage line disposed between the first branch electrode and the second branch electrode are partially overlapped with the pixel electrode.

15. The display apparatus of claim 14, wherein the dummy patterns comprise:
a plurality of first dummy patterns branched from a first storage line disposed in the upper portion of the display area in an upper direction opposite to the second direction; and
a plurality of second dummy patterns branched from a last gate line disposed in the lower portion of the display area in the second direction.

16. The display apparatus of claim 14, wherein the display panel comprises:
a first substrate in which the pixels are disposed;
a second substrate disposed to face the first substrate and including a common electrode facing the pixel electrode; and
a liquid crystal layer interposed between the first substrate and the second substrate, and the common electrode receives a same voltage as a voltage applied to the shielding electrode.

17. A display apparatus comprising:
a display panel that includes a display area in which a plurality of pixels is disposed and a non-display area disposed adjacent to the display area;
a plurality of dummy patterns that extends in a first direction and is disposed in the non-display area;
a plurality of color filters that extends in a second direction substantially perpendicular to the first direction in the display area to overlap with the pixels arranged in the second direction;
a plurality of dummy color filters that extends in the second direction from the color filters and is disposed in the non-display area,
wherein the dummy patterns are partially overlapped with corresponding dummy color filters in the second direction.

18. The display apparatus of claim 17, wherein the dummy patterns comprise:
a plurality of first dummy patterns disposed in the non-display area adjacent to an upper portion of the display area; and
a plurality of second dummy patterns disposed in the non-display area adjacent to a lower portion of the display area.

19. The display apparatus of claim 18, wherein the dummy color filters comprise:
a plurality of first dummy color filters disposed in the non-display area adjacent to the upper portion of the display area; and
a plurality of second dummy color filters disposed in the non-display area adjacent to the lower portion of the display area, and a predetermined area in an upper portion of the first dummy color filters is partially overlapped with a corresponding first dummy pattern of the first dummy patterns, and a predetermined area in a lower portion of the second dummy color filters is partially overlapped with a corresponding second dummy pattern of the second dummy patterns.

20. The display apparatus of claim 19, wherein each pixel comprises:
a pixel electrode disposed in a pixel area corresponding to the pixel;
a gate line extending in the first direction and disposed in a non-pixel area adjacent to the pixel area;
a data line extending in the second direction and disposed in the non-pixel area, the data line being insulated from the gate line while crossing the gate line;
a thin film transistor connected to the pixel electrode, the gate line, and the data line; and
a shielding electrode extending in the second direction and disposed in the non-pixel area, the shielding electrode having a width greater than a width of the data line in the first direction, and the shielding electrode extends in the non-display area adjacent to the upper and lower portions of the display area via an upper surface of a corresponding first dummy color filter of the first dummy color filters and a lower surface of a corresponding second dummy color filter of the second dummy color filters.

* * * * *